US012701529B2

(12) United States Patent
Wild et al.

(10) Patent No.: US 12,701,529 B2
(45) Date of Patent: Aug. 4, 2026

(54) Wi-Fi PROTOCOL ENHANCEMENT TECHNIQUES UTILIZING BEACON FRAME AND UNIQUE IDENTIFIER FOR LOW POWER NETWORKING FOR THE INTERNET-OF-THINGS

(71) Applicant: AMAZON TECHNOLOGIES, INC., Seattle, WA (US)

(72) Inventors: Ben Wild, San Francisco, CA (US); Rob Barton, Mountain View, CA (US); Ravneet Bajwa, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 16/017,812

(22) Filed: Jun. 25, 2018

(65) Prior Publication Data

US 2018/0376448 A1 Dec. 27, 2018

Related U.S. Application Data

(60) Provisional application No. 62/523,771, filed on Jun. 23, 2017.

(51) Int. Cl.
| | |
|---|---|
| *H04W 64/00* | (2009.01) |
| *H04L 67/12* | (2022.01) |
| *H04W 68/00* | (2009.01) |
| *H04W 84/22* | (2009.01) |
| *H04W 84/12* | (2009.01) |

(52) U.S. Cl.
CPC ............. *H04W 64/00* (2013.01); *H04L 67/12* (2013.01); *H04W 64/003* (2013.01); *H04W 68/005* (2013.01); *H04W 84/22* (2013.01); *H04W 84/12* (2013.01)

(58) Field of Classification Search
CPC ... H04W 64/00; H04W 85/12; H04W 68/005; H04L 67/12; G01S 40/244; G01S 5/0226; G01S 19/48; G01S 1/022
See application file for complete search history.

(56) References Cited

U.S. PATENT DOCUMENTS

| | | | |
|---|---|---|---|
| 6,847,647 B1 * | 1/2005 | Wrenn | H04L 47/10 711/216 |
| 7,193,644 B2 | 3/2007 | Carter | |
| 7,755,360 B1 * | 7/2010 | Martin | G01V 3/15 324/326 |
| 8,139,098 B2 | 3/2012 | Carter | |
| 8,144,183 B2 | 3/2012 | Carter | |
| 8,154,581 B2 | 4/2012 | Carter | |
| 8,699,636 B2 | 4/2014 | Wild | |
| 8,780,201 B1 | 7/2014 | Scalisi et al. | |

(Continued)

*Primary Examiner* — Pakee Fang

(74) *Attorney, Agent, or Firm* — Eversheds Sutherland (US) LLP

(57) ABSTRACT

A system and method enhances Wi-Fi protocol by transmitting an Internet-of-Things (IoT) notification map designated for an IoT device. The IoT notification map having format of at least part of a beacon frame and be included in an IoT beacon frame that, when transmitted by at least one router, causes the IoT device to perform an operation indicated in the IoT notification map. The at least one router may be part of the router cluster designated for the IoT device. The router cluster may include a subset of a plurality of routers within a geographical area associated with a location of the IoT device.

17 Claims, 16 Drawing Sheets

(56) References Cited

U.S. PATENT DOCUMENTS

| | | | |
|---|---|---|---|
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,879,455 B1* | 11/2014 | Stephenson | H04W 72/005 370/312 |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,367,718 B2 | 6/2016 | Wild et al. | |
| 9,508,239 B1 | 11/2016 | Harrison et al. | |
| 9,521,277 B1* | 12/2016 | Johnson | G06F 3/1238 |
| 9,557,404 B1 | 1/2017 | Wild et al. | |
| 9,565,192 B2* | 2/2017 | Chillappa | H04L 63/20 |
| 9,689,958 B1 | 6/2017 | Wild et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2003/0011467 A1* | 1/2003 | Suomela | G08C 17/02 340/7.1 |
| 2004/0095900 A1* | 5/2004 | Siegel | H04L 61/5069 370/328 |
| 2005/0058112 A1* | 3/2005 | Lahey | H04L 41/5067 370/338 |
| 2005/0163078 A1* | 7/2005 | Oba | H04L 63/08 370/331 |
| 2005/0245305 A1* | 11/2005 | Asher | G07F 17/3288 463/16 |
| 2005/0281243 A1* | 12/2005 | Horn | H04L 1/1803 370/345 |
| 2007/0202888 A1* | 8/2007 | Brachet | G01S 5/02 455/456.1 |
| 2008/0298290 A1* | 12/2008 | Wentink | H04W 52/0216 370/311 |
| 2011/0148699 A1* | 6/2011 | Anderson | G01S 19/34 342/357.31 |
| 2011/0208859 A1* | 8/2011 | Fernandez Gutierrez | H04L 65/1104 709/224 |
| 2011/0222449 A1* | 9/2011 | Goldberg | H04Q 9/00 370/311 |
| 2012/0001797 A1* | 1/2012 | Ling | G01S 19/246 342/357.42 |
| 2012/0063427 A1* | 3/2012 | Kandekar | G06Q 30/0251 370/338 |
| 2013/0089085 A1* | 4/2013 | Ben-Moshe | H04W 4/08 370/338 |
| 2013/0322415 A1* | 12/2013 | Chamarti | G01S 5/0231 370/338 |
| 2013/0324154 A1* | 12/2013 | Raghupathy | G01S 5/0236 455/456.1 |
| 2014/0003406 A1* | 1/2014 | Kamath | H04W 76/25 370/338 |
| 2014/0018037 A1* | 1/2014 | Shanmugavadivel | H04W 48/18 455/411 |
| 2014/0077998 A1* | 3/2014 | Amizur | G01S 5/10 342/386 |
| 2014/0098682 A1* | 4/2014 | Cao | H04W 36/00835 370/252 |
| 2014/0153460 A1* | 6/2014 | Shrivastava | H04W 56/00 370/311 |
| 2014/0206379 A1* | 7/2014 | Mayor | H04W 64/006 455/456.1 |
| 2014/0211678 A1* | 7/2014 | Jafarian | H04W 68/02 370/311 |
| 2014/0233443 A1* | 8/2014 | Kumar | H04L 12/12 370/311 |
| 2014/0254577 A1* | 9/2014 | Wright | H04W 12/04 370/338 |
| 2014/0334458 A1* | 11/2014 | Park | H04W 72/1221 370/336 |
| 2015/0087238 A1* | 3/2015 | Palanki | G01S 5/0242 455/67.11 |
| 2015/0245305 A1* | 8/2015 | Camps Mur | H04W 48/16 370/350 |
| 2015/0356694 A1* | 12/2015 | L'Heureux | G06Q 50/12 705/15 |
| 2016/0036764 A1* | 2/2016 | Dong | H04L 61/3025 370/254 |
| 2016/0100287 A1* | 4/2016 | Thornycroft | H04W 4/023 455/456.1 |
| 2016/0112262 A1* | 4/2016 | Johnson | G06F 9/45504 709/221 |
| 2016/0112518 A1* | 4/2016 | Haleem | H04W 4/70 713/168 |
| 2016/0283191 A1* | 9/2016 | Lu | G11B 27/105 |
| 2017/0078967 A1* | 3/2017 | Asterjadhi | H04W 52/0229 |
| 2017/0093619 A1* | 3/2017 | Chen | G06F 16/951 |
| 2017/0155703 A1* | 6/2017 | Hao | H04L 67/12 |
| 2017/0171862 A1* | 6/2017 | Matsuo | H04W 52/0225 |
| 2017/0171886 A1* | 6/2017 | Nabetani | H04W 72/0413 |
| 2017/0188242 A1* | 6/2017 | Ghosh | H04W 24/08 |
| 2017/0188302 A1* | 6/2017 | Qi | H04L 69/324 |
| 2017/0188409 A1* | 6/2017 | Lee | H04W 76/19 |
| 2017/0193593 A1* | 7/2017 | Na | H04W 4/023 |
| 2017/0195424 A1* | 7/2017 | Nasir | H04L 67/36 |
| 2017/0347372 A1* | 11/2017 | Li | H04L 49/90 |
| 2017/0353462 A1* | 12/2017 | Siwal | H04W 12/088 |
| 2017/0353859 A1* | 12/2017 | Idnani | H04W 12/08 |
| 2017/0353946 A1* | 12/2017 | Rico Alvarino | H04W 4/70 |
| 2017/0359343 A1* | 12/2017 | Sterl | H04L 63/0876 |
| 2018/0077111 A1* | 3/2018 | Pang | H04L 61/5061 |
| 2018/0139622 A1* | 5/2018 | Cornforth | H04W 24/00 |
| 2018/0184445 A1* | 6/2018 | Larmo | H04W 74/006 |
| 2018/0191545 A1* | 7/2018 | Liu | H04L 7/06 |
| 2018/0220476 A1* | 8/2018 | Jung | H04W 12/06 |
| 2018/0270228 A1* | 9/2018 | Bauer | H04L 63/0435 |
| 2018/0322563 A1* | 11/2018 | Wan | G06Q 10/0833 |

* cited by examiner

DETERMINE WI-FI ROUTER LOCATION

1404

GENERATE THE IOT NOTIFICATION MAP INCLUDING THE LOCATION AND/OR OTHER IOT INFORMATION

1406

INCLUDE IOT NOTIFICAITON MAP IN SSID AND/OR TIM FIELD OF A STANDARD BEACON FRAME TO GENERATE AN IOT BEACON FRAME

1408

TRANSMIT THE IOT BEACON FRAME

1500

RECEIVE CURRENT LOCATION OF IOT DEVICE    1502

UPDATE IOT LOCATION DATABASE WITH CURRENT LOCATION    1504

GENERATE COMMAND FOR IOT DEVICE    1506

GENERATE IOT NOTIFICATION MAP TO INDICATE COMMAND WAITING FOR THE IOT DEVICE    1508

DETERMINE ROUTER CLUSTER FOR IOT DEVICE    1510

SEND IOT NOTIFICATION MAP TO WI-FI ROUTERS IDENTIFIED IN THE ROUTER CLUSTER    1512

Wi-Fi PROTOCOL ENHANCEMENT TECHNIQUES UTILIZING BEACON FRAME AND UNIQUE IDENTIFIER FOR LOW POWER NETWORKING FOR THE INTERNET-OF-THINGS

RELATED APPLICATIONS

This application claims priority to U.S. Patent Application Ser. No. 62/523,771, filed Jun. 23, 2017, and incorporated herein by reference.

BACKGROUND

Wireless networks have evolved significantly over time. Today, most wide area wireless networks are built using rugged outdoor base stations that are mounted on rooftops and buildings. The base stations receive wireless signals from devices, such as cell phones, that run on the network. Other devices, such as sensors, can also send data over these wireless networks. Several companies have successfully opened shared channels on millions of Wi-Fi routers to enable mobile devices such as laptops to connect to the internet across entire cities. However, the Wi-Fi protocol uses a relatively high transmission power, as compared to Bluetooth for example, and thereby communication using the Wi-Fi protocol consumes more power.

SUMMARY

Embodiments herein relate to novel techniques to create a distributed low power wireless network using Wi-Fi routers as the gateways of the network. The techniques described allow for battery powered sensors, tracking devices, and other Internet-of-Things (IoT) devices to connect to Wi-Fi networks with very low power consumption.

One approach to building wireless networks is to use Wi-Fi routers as the gateways for the network. The challenge with doing this is that the Wi-Fi protocol requires more power consumption than other available protocols to establish and maintain a connection. In addition, the Wi-Fi protocol was not designed to allow for connections that consume less power, specifically for connections with and/or between low powered (e.g., battery powered) IoT devices. However, due to the wide distribution of Wi-Fi networks and devices that are capable of communicating using the Wi-Fi protocol, it is advantageous to leverage this network for various IoT applications. This disclosure proposes several techniques that allow Wi-Fi routers to support limited power and/or battery powered IoT devices, such as sensors, trackers, and other mobile IoT devices. One aspect of the present embodiments includes the realization that Wi-Fi hardware complying to the Wi-Fi protocol uses a significant amount of power as compared to hardware complying to the Bluetooth protocol for example. The present embodiments solve this problem by including additional information in a beacon frame generated by a Wi-Fi router such that a limited power IoT device may receive the additional information without connecting to (e.g., associating and authentication with) the Wi-Fi router. Advantageously, by including the additional information within the beacon frame, the limited power IoT device is not required to connect to the Wi-Fi router to retrieve the additional information and thereby does not expend power interacting with the Wi-Fi router. Another aspect of the present embodiments includes the realization that the Wi-Fi protocol requires continual connection of the Wi-Fi client to the Wi-Fi router to ensure the Wi-Fi client may receive commands (or other messages/data) from a server. data may be exchanged. The present embodiments solve this problem by generating the beacon frame to include a notification of a command (or other message) from the server such that the IoT device may determine that there is a command (or other message) at the server without remaining connected to the Wi-Fi router and without connecting to the Wi-Fi router.

The embodiments described herein solve the above-described problems at least in part by disclosing the architecture of a distributed Wi-Fi network. The architecture includes Wi-Fi routers implementing aspects of the protocol described in the present disclosure, a network server that manages a network of Wi-Fi routers, and IoT devices that connect to servers via one or more of the Wi-Fi routers in the network. The embodiments described herein reduce power consumed by the IoT devices when using the distributed Wi-Fi network to communicate with the servers. The embodiments described herein also teach of modification of the Wi-Fi beacon fields (such as the TIM and SSID fields) to reduce power consumption by the IoT device. Certain embodiments teach of synchronizing the beacon frames to further reduce power consumption by the IoT device. The embodiments described herein teach of methods for locating the IoT device using the distributed Wi-Fi network such that the IoT device uses less power.

In a first aspect, a computer-implemented method includes: determining a location associated with a first router of a set of routers within a geographic region having at least one Internet-of-Things (IoT) device located therein. The first aspect further includes determining a router cluster including a subset of routers of the set of routers, the subset of routers including the first router. The first aspect further includes transmitting an IoT notification map designated for the at least one IoT device such that the IoT notification map is included within a beacon frame to generate an IoT beacon frame transmitted by at least one of the routers in the subset of routers.

In a second aspect, a system comprises: at least one processor; and memory storing non-transitory computer readable instructions that, when executed by the processor, cause the system to: transmit an Internet-of-Things (IoT) notification map designated for an IoT device, the IoT notification map having format of at least part of a beacon frame and included in an IoT beacon frame that, when transmitted by at least one router of a router cluster defined for the IoT device, causes the IoT device to perform an operation indicated in the IoT notification map, the router cluster including a subset of a plurality of routers within a geographical area associated with a location of the IoT device.

In at least some embodiments of the second aspect, the operation includes transmitting a location of the IoT device to a server in response to information included in the IoT notification map.

In at least some embodiments of the second aspect, the IoT beacon frame is broadcast in place of a standard beacon frame broadcast by the at least one router.

In at least some embodiments of the second aspect, the instructions further causing the system to determine, at a server, the router cluster based on the location of the IoT device; and, the instructions that cause the system to the transmit the IoT notification map including further include instructions that, when executed by the at least one processor, cause the system to transmit, from the server to the at least one router of the router cluster, the IoT notification map.

In at least some embodiments of the second aspect, the memory further includes instructions that, when executed by the one or more processor, cause the system to: monitor characteristic of the IoT device, the characteristic including one or more of direction of travel of the IoT device, speed of travel of the IoT device, and the current location of the IoT device, and determine a new router cluster for the IoT device when the characteristic indicates the IoT device has a threshold relationship with the geographical area.

In at least some embodiments of the second aspect, the threshold relationship includes one or more of: location of the IoT device with respect to the boundary of the geographical area, speed of travel of the IoT device within the geographical area, and, direction of travel of the IoT device within the geographical area.

In at least some embodiments of the second aspect, the threshold relationship includes location of the IoT device with respect to the boundary of the geographical area.

In at least some embodiments of the second aspect, the threshold relationship includes speed of travel of the IoT device within the geographical area.

In at least some embodiments of the second aspect, the threshold relationship includes direction of travel of the IoT device within the geographical area.

In at least some embodiments of the second aspect, the memory further includes instructions that, when executed by the one or more processor, cause the system to synchronize transmission of the IoT beacon frame by a plurality of routers within the router cluster based at least in part by a point in time.

In at least some embodiments of the second aspect, the IoT notification map has format of a TIM field of a standard beacon frame.

In at least some embodiments of the second aspect, the IoT notification map has format of an SSID field of a standard beacon frame.

In at least some embodiments of the second aspect, the IoT notification map includes a device identifier corresponding to the IoT device.

In at least some embodiments of the second aspect, the device identifier further corresponds to a plurality of IoT devices of which the IoT device is a member.

In at least some embodiments of the second aspect, the IoT notification map is appended to a field of a standard beacon frame to generate the IoT beacon frame.

In at least some embodiments of the second aspect, the IoT notification map includes a field of the IoT beacon frame identifiable by the IoT device.

In at least some embodiments of the second aspect, the IoT notification map includes a defined set of bits identifying the location of the at least one router.

In at least some embodiments of the second aspect, the memory further includes instructions that, when executed by the one or more processor, cause the system to establish a communication path with the IoT device in response to the IoT device indicating receipt of the IoT notification map corresponding to the IoT device.

In at least some embodiments of the second aspect, the instructions that cause the system to establish a communication path cause the system to receive information from the IoT device within a password field associated with the at least one router without the IoT device connecting to the at least one router.

In at least some embodiments of the second aspect, the instructions that cause the system to establish the communication path cause the system to establish a connection between the IoT device to the at least one router.

In at least some embodiments of the second aspect, the operation including one or both of: reporting a location of the IoT device to a server, and the IoT device connecting to the server to receive a command.

In a third aspect, a non-transitory computer readable medium, comprises computer readable instructions that when executed by a processor cause the processor to: transmit an Internet-of-Things (IoT) notification map associated with an IoT device, the IoT notification map generated based at least in part on a field of a beacon frame and included in an IoT beacon frame that, when transmitted by at least one router of a router cluster associated with the IoT device, the router cluster including a subset of a plurality of routers within a geographical area associated with a location of the IoT device.

BRIEF DESCRIPTION OF THE FIGURES

Some embodiments of the present embodiments are illustrated as an example and are not limited by the figures of the accompanying drawings, in which like references may indicate similar elements.

FIG. 5A is a schematic diagram illustrating one example method for indicating, within an IoT beacon frame, that a command is available for an IoT device according to various embodiments.

FIG. 6 is a schematic diagram illustrating dynamic creation and/or modification of a Wi-Fi router cluster as a function of a position of a mobile IoT device according to various embodiments.

DETAILED DESCRIPTION OF THE EMBODIMENTS

Figure 1:
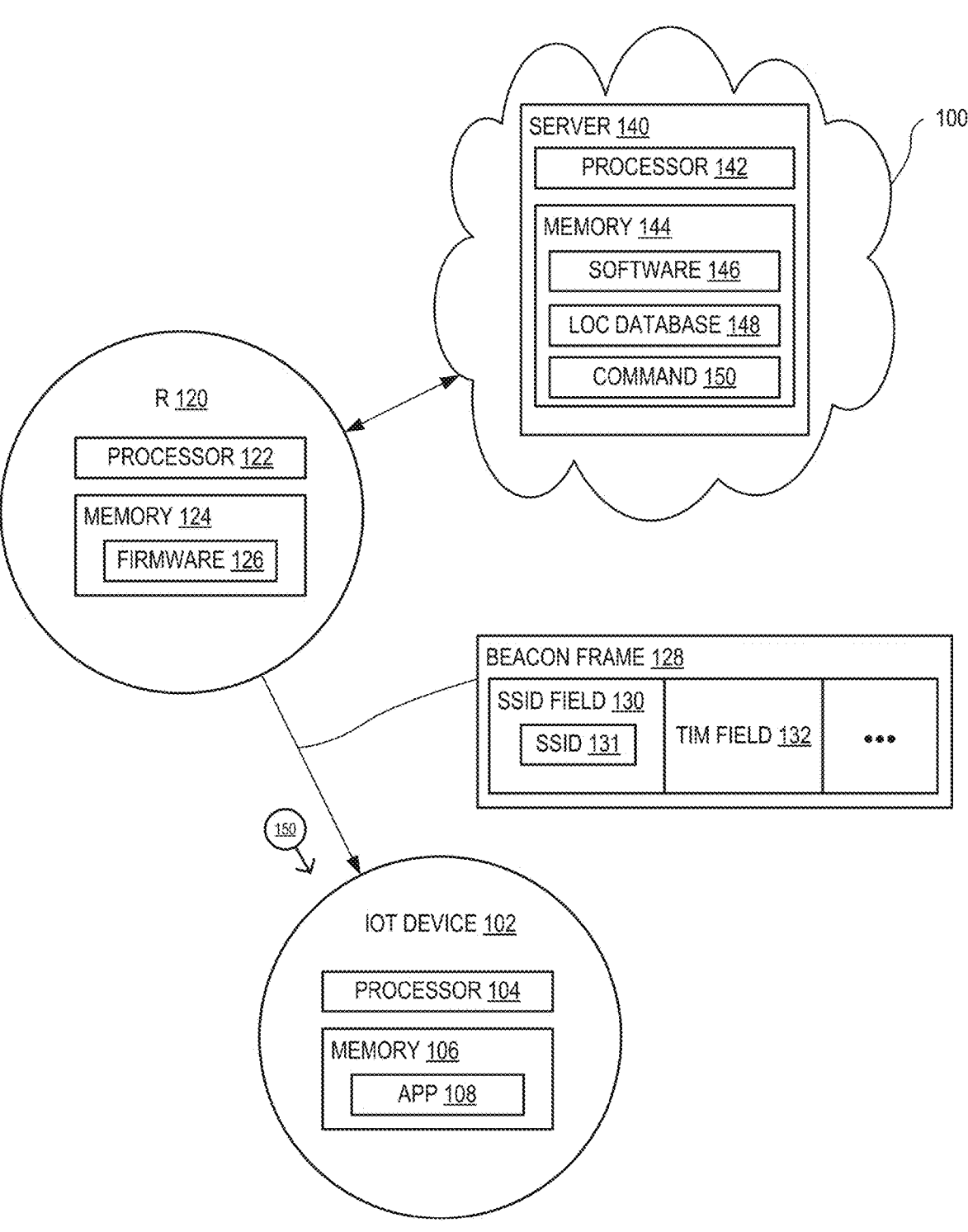
FIG. 1 is a schematic diagram illustrating a system architecture with Wi-Fi routers communicating with an Internet-of-Things (IoT) device, the IoT device scanning for the Wi-Fi beacons according to various embodiments.

FIG. 1 is a schematic diagram illustrating communication between an Internet-of-Things (IoT) device 102 and a Wi-Fi router 120 when connecting to a server 140 over a network 100 (e.g., the Internet). Wi-Fi may refer to the IEEE 802.11 protocol or the like, wherein the Wi-Fi router 120 implements the Wi-Fi protocol to allow wireless connectivity between the IoT device 102 and the server 140 via the network 100. The IoT device 102 is for example a battery powered portable device, such as a tracker that may be used to track the location and/or movement of an object to which it is attached or otherwise integrated into. In other examples, the IoT device 102 represents various other devices that include a Wi-Fi processor (e.g., a Wi-Fi chipset) or other component capable of communicating over a network using the Wi-Fi protocol, such as a laptop computer, a mobile device, and/or a tablet.

The IoT device 102 may include a processor 104 and memory 106 storing an application 108 that includes machine readable instructions that, when executed by the processor 104, implement the logic and functionality of the IoT device 102 as described in the various embodiments. The Wi-Fi router 120 may include a processor 122 and memory 124 storing firmware 126 (such as firmware, an application, software, or other source code) that includes machine readable instructions that, when executed by the processor 122, implement the logic and functionality of the Wi-Fi router 120 as described in various embodiments herein. The server 140 may include a processor 142 and memory 144 storing software 146 that includes machine readable instructions that, when executed by the processor 142, implement the logic and functionality of the server 140 as described in various embodiments herein.

To connect to the server 140 via the network 100, the IoT device 102 may first scan (e.g., activates a wireless receiver to scan through multiple channels) to detect a standard beacon frame 128 that is, at certain intervals, transmitted by the Wi-Fi router 120 on one of the channels. As described in the present disclosure, a "standard beacon frame" includes a beacon frame as commonly used in accordance with the Wi-Fi protocol. As such, the standard beacon frame 128 may include a service set identifier (SSID) field 130, a traffic indication map (TIM) field 132, and may include other information, such as channel and timing information implemented by the Wi-Fi router 120. The SSID field 130 may contain an SSID 131 that identifies the Wi-Fi router 120 and the TIM field 132 may contain a plurality of bits that indicate whether any device connected to the Wi-Fi router 120 has buffered UNICAST frames. When the IoT device 102 detects and/or receives the standard beacon frame 128, the IoT device 102 may connect (e.g., authenticate and associate) to the Wi-Fi router 120 using conventional Wi-Fi protocols. Because the exchange of data between the IoT device 102 and the Wi-Fi router 120, when the IoT device 102 is connected to the Wi-Fi router 120, may use conventional Wi-Fi protocols, the exchange requires a significant amount of power (relative to other communication methods that require fewer messages to be exchanged between devices to establish and/or maintain the connection and/or require less power to transmit and receive messages) to operate the receiver and transmitter (e.g., transceiver) of the IoT device 102. Not only does the Wi-Fi hardware (e.g., the Wi-Fi connectivity chipset) consume a large amount of power, but so does the frequency of back and forth communication customary with the Wi-Fi protocol. Where the IoT device 102 has a limited amount of power (e.g., powered by a battery) and communication should be low latency (e.g., responsive to location changes and/or a command 150 from the server 140), such as when the IoT device 102 is a tracker with limited battery power, conventional Wi-Fi communication drains the battery relatively quickly, thereby making the use of Wi-Fi for communication difficult for the IoT device 102. This problem is exacerbated when the IoT device 102 is a tracker that frequently determines its current location by connecting to the Wi-Fi router 120.

However, since Wi-Fi is prevalent, it would be advantageous to use Wi-Fi access points (e.g., the Wi-Fi routers 120) for communication with the IoT device 102. Therefore, there is a need to reduce the power used by the IoT device 102 to communicate with the server 140 via the network 100, when determining its location, and particularly for communication between the IoT device 102 and the Wi-Fi router 120. The embodiments disclosed herein describe techniques to reduce power requirements of the IoT device 102 for obtaining location information and for leveraging a network of Wi-Fi routers for backhaul of data.

In many applications (e.g., the application 108) it is helpful for the IoT device 102 to discover its current location such that it may make decisions based upon that location or report that location. One approach is to build, within the server 140, a location database 148 that relates (e.g., based at least in part upon the SSID 131, or modified SSIDs discussed below) a geographic location within one or more Wi-Fi routers 120 and a corresponding signal strength of the signal received, at that geographic location, from the Wi-Fi router 120. To determine its position, the IoT device 102 may send a list of SSIDs 131 and corresponding signal strengths of the standard beacon frames 128 (and/or IoT beacon frames 228, 510 as discussed below) received at its current location to the server 140. The software 146 within the server 140 may compute an exact or at least approximate geographic location of the IoT device 102 based on corresponding entries (e.g., identified by matching SSIDs 131 or modified SSIDs included in IoT beacons 228 or 510 discussed below) in the location database 148 and one or more known algorithms (e.g., triangulation, trilateration, signal propagation, and so on) that use the corresponding Wi-Fi router locations and beacon signal strengths. While this approach is reliable, it requires, for each locate operation, multiple communications between the IoT device 102 and the Wi-Fi router 120, and, therefore, consumes a significant portion of power available to the IoT device 102, thereby reducing operational life of the IoT device 102.

Where the IoT device 102 is a tracker, or other such embodiment that requires its current location to be frequently determined, it is useful for the application 108 of the IoT device 102 to compute whether it has breached a geofence boundary. For example, when the IoT device 102 enters or exits a zone (e.g., a defined area that forms the geofence boundary), the IoT device 102 may indicate the zone change to the server 140, via the Wi-Fi router 120, which may result in the server 140 generating and sending an alert to a client device such that appropriate action may be taken. To reduce latency of reporting such zone changes, the IoT device 102 may determine its current location frequently. However, as noted above, power consumed by the IoT device 102 when communicating frequently with the server 140, via the Wi-Fi router 120, to determine its location may be significant and even prohibitive to operation. Accordingly, Wi-Fi connectivity has not been favored by such tracking applications. In addition, the IoT device 102 may not include other positioning systems and/or location systems such as a global navigation satellite system (GNSS).

To reduce the communication between the IoT device 102 and the server 140, in an attempt to reduce the need for frequent communications, the location database 148 may be stored in the memory 106 of the IoT device 102. However, since the intended area of use of the IoT device 102 is unknown, and because there are millions of Wi-Fi routers 120 in operation, the size of the location database 148 likely exceeds the capacity of the memory 106 for most implementations of the IoT device 102.

Advantageously, the embodiments disclosed hereinafter reduce communication between the IoT device 102 and the Wi-Fi router 120, and corresponding power needs, without any need to reduce the frequency with which the IoT device 102 determines its current location. Accordingly, operational life of the IoT device 102 when powered from a battery is improved.

Position Encoding in the SSID or TIM Field

Figure 2:
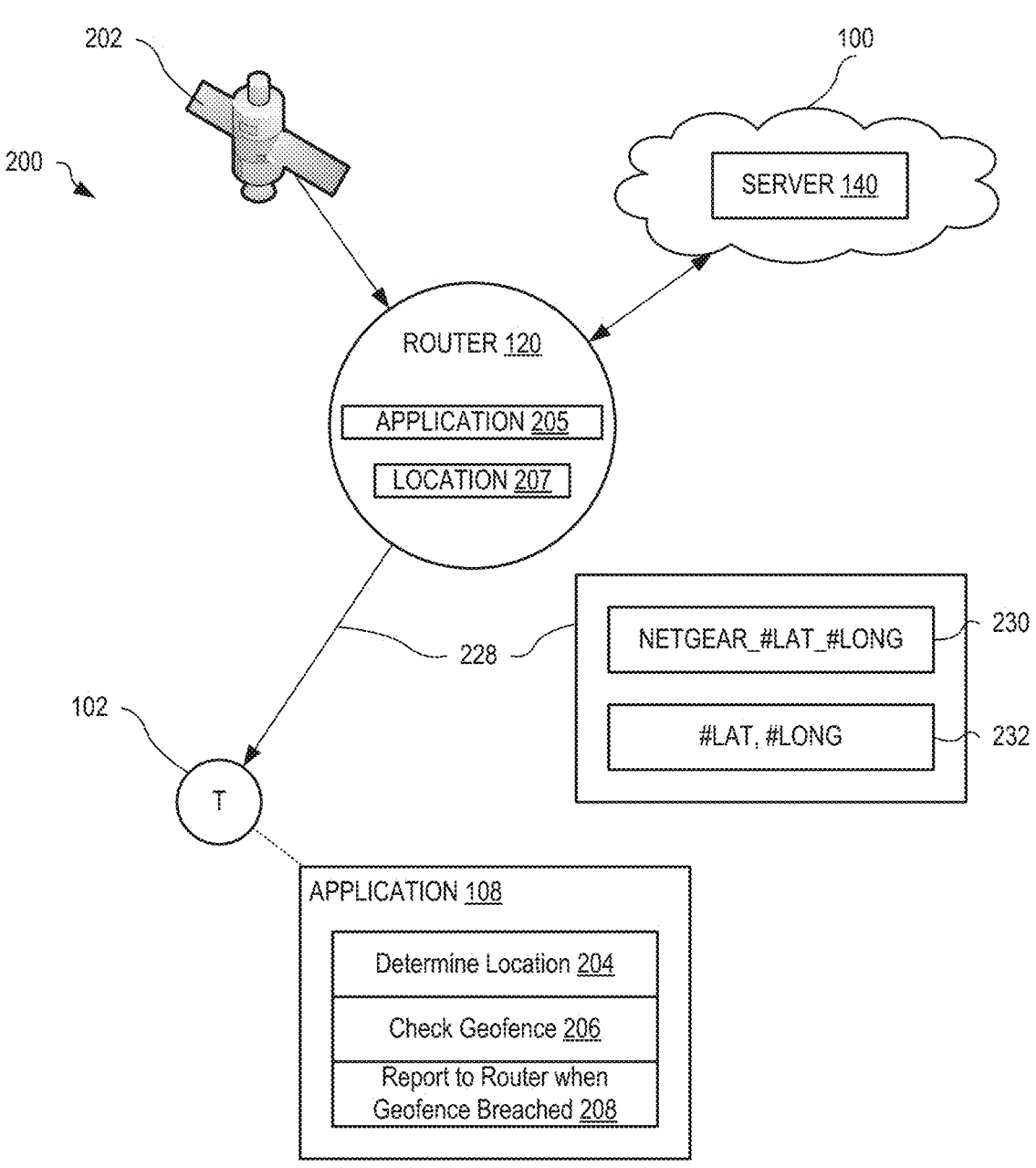
FIG. 2 is a schematic diagram illustrating encoding of Wi-Fi router position into the service set identifier (SSID), the traffic indication map (TIM) bits, or both, according to various embodiments.

FIG. 2 is a schematic diagram showing an IoT Wi-Fi environment 200 that reduces power consumption of the IoT device 102 when determining its current location using the infrastructure of a conventional Wi-Fi network. Advantageously, use of the IoT Wi-Fi environment 200 does not require the IoT device 102 to include the location of each of the Wi-Fi routers 120, and therefore does not have the memory overhead, and associated cost, of a locally-stored location database. Further, this embodiment does not require the IoT device 102 to communicate with the Wi-Fi router 120, or the server 140, using conventional Wi-Fi communication protocols, to obtain location information such that it may determine its location or that of the Wi-Fi router 120. In FIG. 2, the Wi-Fi router 120 may include a router application 205 (e.g., an update to the firmware 126 and/or standalone application) that controls the Wi-Fi router 120 to determine and/or obtain (e.g., from the server 140) its geographic location 207 and transmit the geographic location 207 within a modified beacon frame, shown as IoT beacon frame 228 in FIG. 2. In various embodiments, the IoT beacon frame 228 includes additional information appended to or within the standard beacon frame used in accordance with Wi-Fi protocol. For example, an IoT beacon frame may include the location (e.g., in latitude/longitude format) in addition to the normal SSID of the router 120. As another example, the IoT beacon frame may include an IoT notification map as discussed below with reference to IoT notification map 504. As described in the present disclosure, the term "appended" may be used interchangeably with "encoded" and/or "embedded" such that information may be added to, interspersed within, or entirely replace information within the standard beacon frame as used in accordance with Wi-Fi protocol; and such appended information may be encrypted or not encrypted without departing from the scope hereof. By including the geographic location

207 within the IoT beacon frame 228, the IoT device 102 may receive the IoT beacon frame 228 and determine the location of the Wi-Fi router 120 and/or the location of the IoT device 102 without the need for the IoT device 102 to connect (e.g., authenticate and associate using conventional Wi-Fi protocols) to the Wi-Fi router 120. Furthermore, the router 120 additionally broadcast its regular standard beacon frames (e.g., standard beacon frame 128) such that normal client devices receiving and transmitting information from/to the router 120 still operate in accordance with standard Wi-Fi protocol. As such, the IoT beacon frame 228 replaces, or is broadcast in addition to, one or more of the standard beacon frames 128 that are periodically broadcast by the router 120.

The geographic location 207 of the Wi-Fi router 120 may be determined using one of several methods, including but not limited to, IP (Internet protocol) based positioning, determining the ship-to address of the router, having a user configure the geographic location 207 within the Wi-Fi router 120 using a smartphone app that uses the smartphone's location to define the location of the Wi-Fi router 120, and having a GNSS (or other satnav technology) receiver built into the Wi-Fi router 120 to determine its location using a satellite network 202, such as the Global Positioning System (GPS) satellite network.

Once the geographic location 207 is determined/defined and stored within the Wi-Fi router 120, the geographic location 207 may be broadcast in the IoT beacon frame 228 and may be discovered by the IoT device 102. In a first embodiment, the router application 205 appends/embeds the geographic location 207 to/within the SSID field 130 of the standard beacon frame 128 to generate and broadcast the IoT beacon frame 228 having a SSID field 230. Since the SSID field 230 may be up to 512 bits in length, there is sufficient space to encode the geographic location 207 within the SSID field 230. In a second embodiment, the router application 205 appends/embeds the geographic location 207 to/within the TIM field 132 of the standard beacon frame 128 to generate and broadcast the IoT beacon frame 228. Since the TIM field 132 may have up to 2008 bits, there are many unused bits that may be set to communicate location information to the IoT device 102. The geographic location 207 may be encoded within eight bytes, for example. In embodiments, the geographic location 207 is encoded in a defined set of bits/bytes that is obtainable by the IoT device 102 (e.g., consistently in the same location of the standard beacon frame 128). The format used to encode the geographic location 207 may be latitude/longitude, or any other format, and it may be compressed and/or encrypted for privacy reasons.

The IoT device 102 may receive the IoT beacon frame 228 (in addition to or in replace of the standard beacon frame(s) 128), decode the respective bits within the SSID field 230 and/or the TIM field 232 to determine the geographic location of the Wi-Fi router 120, and thereby determine whether it is within a certain radius, defined by the wireless range of the Wi-Fi router 120, of that location. Where the IoT device 102 receives multiple IoT beacon frames 228, it may determine its current location more accurately by using triangulation algorithms, dead reckoning, and/or other techniques using a received signal strength of each of the IoT beacon frames 228 (and, in some embodiments, one or more of the standard beacon frames 128) and/or the corresponding determined location of the Wi-Fi router 120.

In one example, where the IoT device 102 is a tracker, the IoT device 102 transitions from an inactive low power mode (e.g., a hibernation state where one or more components of the IoT device 102 are powered down such that these components do not draw power from the battery and waste power unnecessarily) to an active mode (e.g., when certain components are powered and operational) to receive the IoT beacon frame 228 and to determine its location—indicated as block 204 within the application 108. The IoT device 102 may determine whether a predefined geofence has been breached—indicated as block 206, and may communicate (e.g., transmit) this geofence breach in a message to server 140, via the Wi-Fi router 120, only when it determines that the geofence has been breached—indicated as block 208. Using this approach, the IoT device 102 advantageously does not need store the location database (e.g., relating SSIDs, received signal strengths, and locations) locally in memory of the IoT device 102, since the location information is effectively distributed over the Wi-Fi routers 120.

Position Lookup from Local Database

Where the IoT device 102 is mobile but does not travel over long distances, such as when the IoT device 102 is used within a vehicle of a local pizza delivery company, or when the IoT device 102 is attached to a pet (e.g., to a collar) that does not typically travel outside its home city, the number of Wi-Fi routers 120 that the IoT device 102 may communicate with is small. Accordingly, the size of the location database (e.g., containing, for each of the Wi-Fi routers 120, Wi-Fi router SSIDs, received signal strength, and location where the measurement was made) may be small enough to store within memory of the IoT device 102. Accordingly, the IoT device 102 may store in memory a location database containing information of only the Wi-Fi routers 120 that the IoT device 102 may encounter. For example, where the IoT device 102 is to be used in a certain city, the location database loaded into the IoT device 102 may contain only information of the Wi-Fi routers 120 located within that city. This approach may reduce the number of entries that are stored within the position database to hundreds of thousands, or less, and thereby make it feasible to store the position database in local memory of the IoT device 102.

Figure 3:
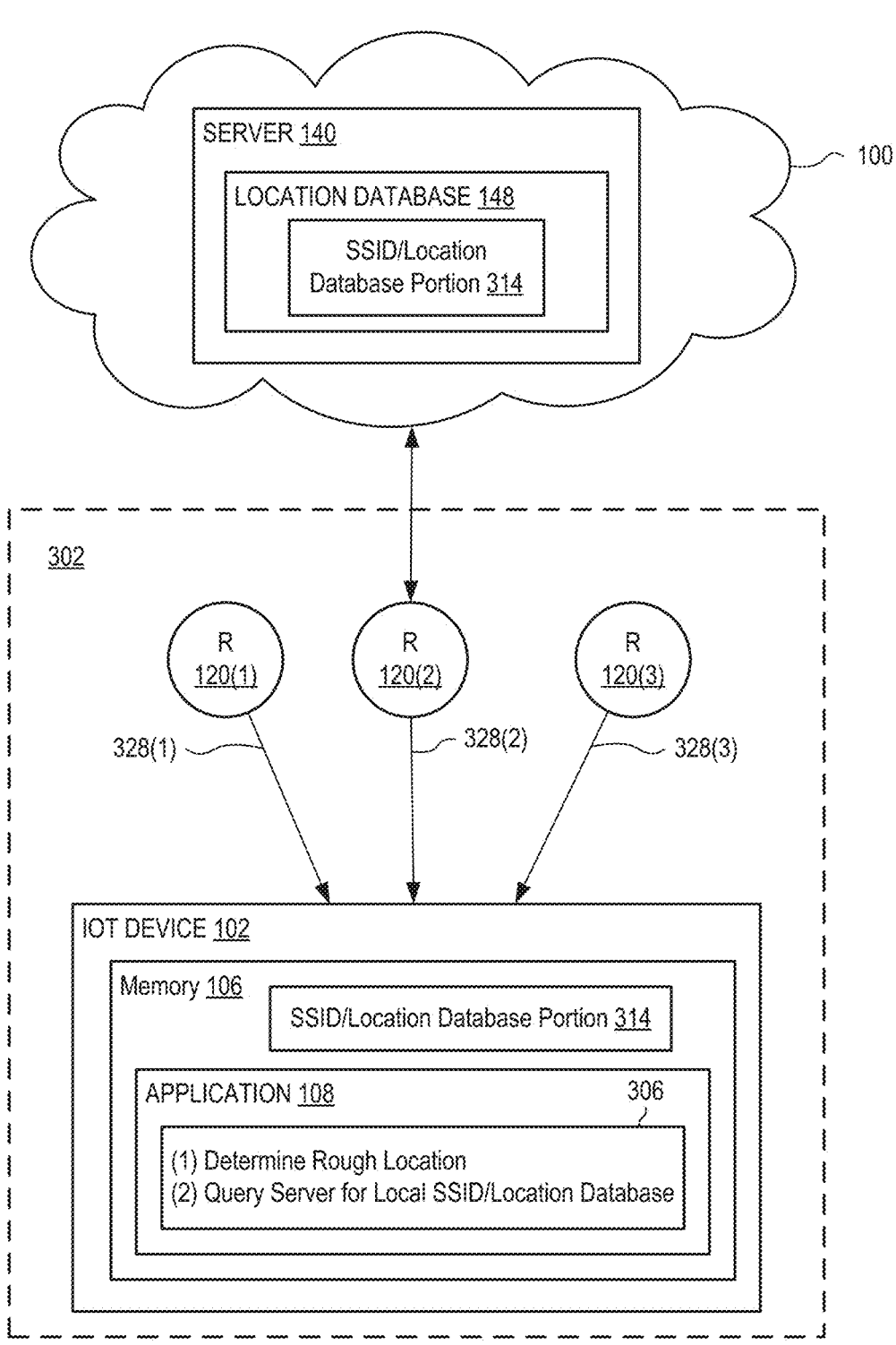
FIG. 3 is a schematic diagram illustrating downloading of a position database that is a subset of the full database according to various embodiments.

FIG. 3 illustrates an embodiment where the IoT device 102 determines and/or detects, over an interval of time, one or more areas (e.g., regions, cities, or towns) where the IoT device 102 may be located during the interval of time, and downloads a database portion 314 corresponding to that area from the location database 148 (FIG. 1) corresponding to an extended area. For example, as shown in FIG. 3, as the IoT device 102 spends time in an area 302 (e.g., a region, city, or town), the IoT device 102 may receive beacon frames 328(1)-(3) from the Wi-Fi routers 120(1)-(3), respectively, download the corresponding database portion 314 from the server 140, and store the database portion 314 in memory 106. Beacon frames 328 represent one or both of the standard beacon frames 128 and the IoT beacon frames 228 discussed above. In certain embodiments, the IoT device 102 may remove previously stored database portions that are no longer being used and/or are associated with particular Wi-Fi routers that have not been detected (e.g., have not received a beacon frame 328 associated with the particular Wi-Fi routers) over an interval of time. Block 306 shows two example steps implemented within the application 108 of the IoT device 102 to download the SSID/location database portion 314 from the server 140. In order for the IoT device 102 to request an appropriate database portion, the IoT device 102 may first determine a current location, and then query the server 140 for the appropriate database portion 314 including the Wi-Fi routers 120 within a given geographic area to the rough location, and download it to the memory 106. Unless otherwise specified, references made herein to a "location" or "current location" may include an exact location, such as determined via an on-board GPS, or cell-phone, or may include a rough estimation of the location, such as via triangulation based on signal strengths.

Figure 9:
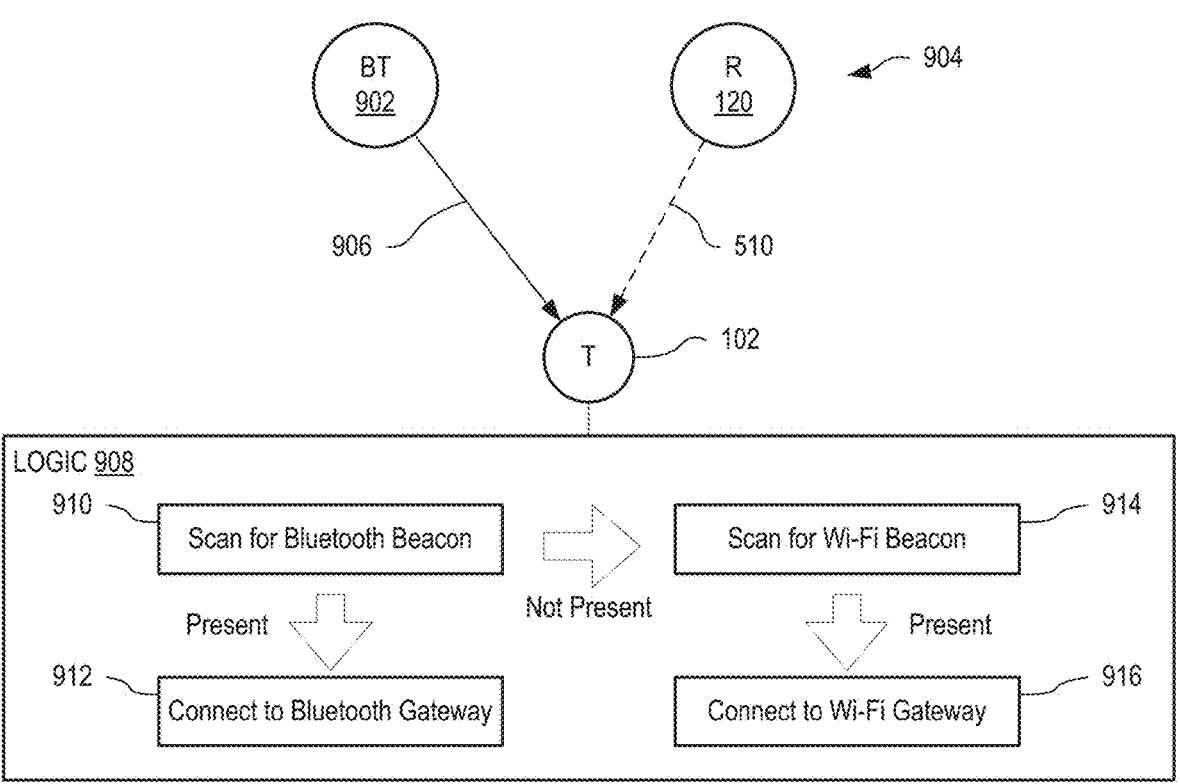
FIG. 9 is a schematic diagram illustrating methods for switching between a Bluetooth gateway and a Wi-Fi gateway according to various embodiments.

In one example, the IoT device 102 may determine its current location by requesting the current location from a connected gateway, such as a Wi-Fi gateway (e.g., Wi-Fi gateway 904, FIG. 9, or the Wi-Fi router 120(2)), a Bluetooth gateway (e.g., Bluetooth gateway 902, FIG. 9) if available, etc. The connected gateway may determine its location through one or more of IP positioning, GNSS positioning (for example, using a phone as a Bluetooth gateway) and/or any other technique. The IoT device 102 may then send the current location to the server 140, which select and send an appropriate SSID/location database portion 314 of the location database 148 to the IoT device 102, where it is stored in memory 106. Advantageously, the IoT device 102 is not required to store the entire location database 148 in its memory 106 to be able to use the SSIDs 131 (or modified SSIDs within SSID field 230) of the Wi-Fi routers 120 in its area to determine the current location.

In yet another embodiment, over an interval of time, the IoT device 102 may detect and store SSIDs from encountered Wi-Fi routers 120 as it moves within an operational area. At the end of the interval of time, the IoT device 102 may send the collected SSIDs to the server 140, which in return sends the SSID/location database portion 314 corresponding to the collected SSIDs (and, optionally, additional nearby routers). Accordingly, the SSID/location database portion 314 corresponds to the operational area of the IoT device 102. Furthermore, in some embodiments, for example, when the IoT device is traveling across a geographic area, the IoT device 102 may detect and store SSIDs or other identification information obtained from detected Wi-Fi routers 120 as it moves and, once the IoT device 102 is able to connect to the server 140, the IoT device 102 may provide the set of SSIDs to the server 140. In this manner, the server 140 may, in some embodiments, determine the IoT device's 102 path.

Low Power Tracking as IoT Device Moves Around Network

Where the IoT device 102 is mobile, its power consumption may increase significantly as it repeatedly authenticates and associates (connects) with each different Wi-Fi router 120 it encounters as it moves. Particularly, the IoT device 102 may, at certain intervals, communicate with one or more of the Wi-Fi routers 120(1)-(3) to determine whether it is to receive the command 150 from the server 140. Without the benefit of the enhancements described herein, where an IoT device is a tracker that is attached to an object that is reported missing, a server would send a command to the tracker requesting that the tracker report its current location to the server. Accordingly, to be responsive to the commend, the tracker would, at certain intervals, query the server, via the Wi-Fi router, to determine whether there is a command from the server waiting for it. As noted above, such Wi-Fi communication between the IoT device 102 and the Wi-Fi router results in relatively high power usage by the IoT device 102. Advantageously, the present embodiments solve this problem by using a technique for the IoT device 102 to determine whether a command is waiting without repeatedly connecting to the Wi-Fi router 120. Further, where the IoT device 102 is mobile, the technique solves this problem by reducing the number of times that the IoT device 102 connects to newly encountered Wi-Fi routers 120 as it moves.

Reducing Power Consumption when IoT Device Connected to a Router

Each bit in the TIM field 132 (FIG. 1) indicates whether there is a packet available in the Wi-Fi router 120 for a specific Wi-Fi client (e.g., a device currently connected to the Wi-Fi router 120). Accordingly, while connected to the Wi-Fi router 120, the IoT device 102 may receive the TIM field 132 in the standard beacon frame 128 and evaluate a corresponding bit of the TIM field 132 to determine whether a packet (e.g., the command 150 from the server 140) is waiting for the IoT device 102. The IoT device 102 may then receive the packet from the Wi-Fi router 120.

The IoT device 102 may not receive every one of the standard beacon frames 128 and/or the IoT beacon frames 228 transmitted by the Wi-Fi router 120. Accordingly, the IoT device 102 may receive only certain ones of the standard beacon frames 128 and/or the IoT beacon frames 228 to evaluate the corresponding bit in the TIM field 132 or 232 to determine whether the command 150 is included in the TIM field or waiting for the IoT device 102 at the server 140. Between these certain ones of the standard beacon frames 128 and/or the IoT beacon frames 228, the IoT device 102 may transition from an active mode to an inactive mode (e.g., enter a low power mode), based upon a listening interval, until the standard beacon frame 128 and/or the IoT beacon frame 228 it is scheduled to receive is expected to transmit. For example, where low latency is less important for the application 108, the listening interval may be thirty seconds. Accordingly, the IoT device 102 may not determine that there is a command waiting for up to thirty seconds from when it was received by the Wi-Fi router 120. In certain embodiments, every Xth beacon frame of a series of beacon frames include a IoT beacon frame 228, whereas the other beacon frames in the series of beacon frames includes a standard beacon frame 128. In such embodiment, the IoT device 102 may awaken during transmission of a standard beacon frame 128, and stay awake until receipt of a IoT beacon frame 228. Once the IoT device 102 knows/determines the period of the IoT beacon frame 228 transmittal, the IoT device 102 may implement the active mode/inactive mode operation to save battery power.

For low latency applications (e.g., when the IoT device 102 is expected to respond quickly to the command 150 from the server 140), the power used to frequently receive the standard beacon frame 128 and/or the IoT beacon frame 228 and evaluate the SSID field 130, TIM field 132, and/or fields or components of the standard beacon frame 128 and/or the IoT beacon frame 228 (such as SSID field 230 and/or TIM field 232) to determine whether there is a command waiting from the server 140 may consume a significant portion of power available to the IoT device 102. Thus, it is beneficial to reduce the frequency of receiving the standard beacon frame 128 and/or the IoT beacon frame 228, and thereby reduce the power used by the IoT device 102, as much as possible. In certain embodiments, the IoT device 102 may increase the listening interval based at least in part on various factors, for example, whether the IoT device 102 is moving. In the example where the IoT device 102 is a tracker, when the tracker is not moving, responding to the command 150 from the server 140 is less important as there is likely less change in the location of the tracker. In one embodiment, when a sensor measurement (e.g., a measurement of movement, acceleration, velocity, and so on) within the IoT device 102 hasn't significantly changed, the IoT device 102 may increase the listening interval and reduce the frequency of receiving the standard beacon frame 128 and/or the IoT beacon frame 228 to check the TIM field 132 for an indication of the command 150 waiting for the IoT device 102 from the server 140.

Figure 4:
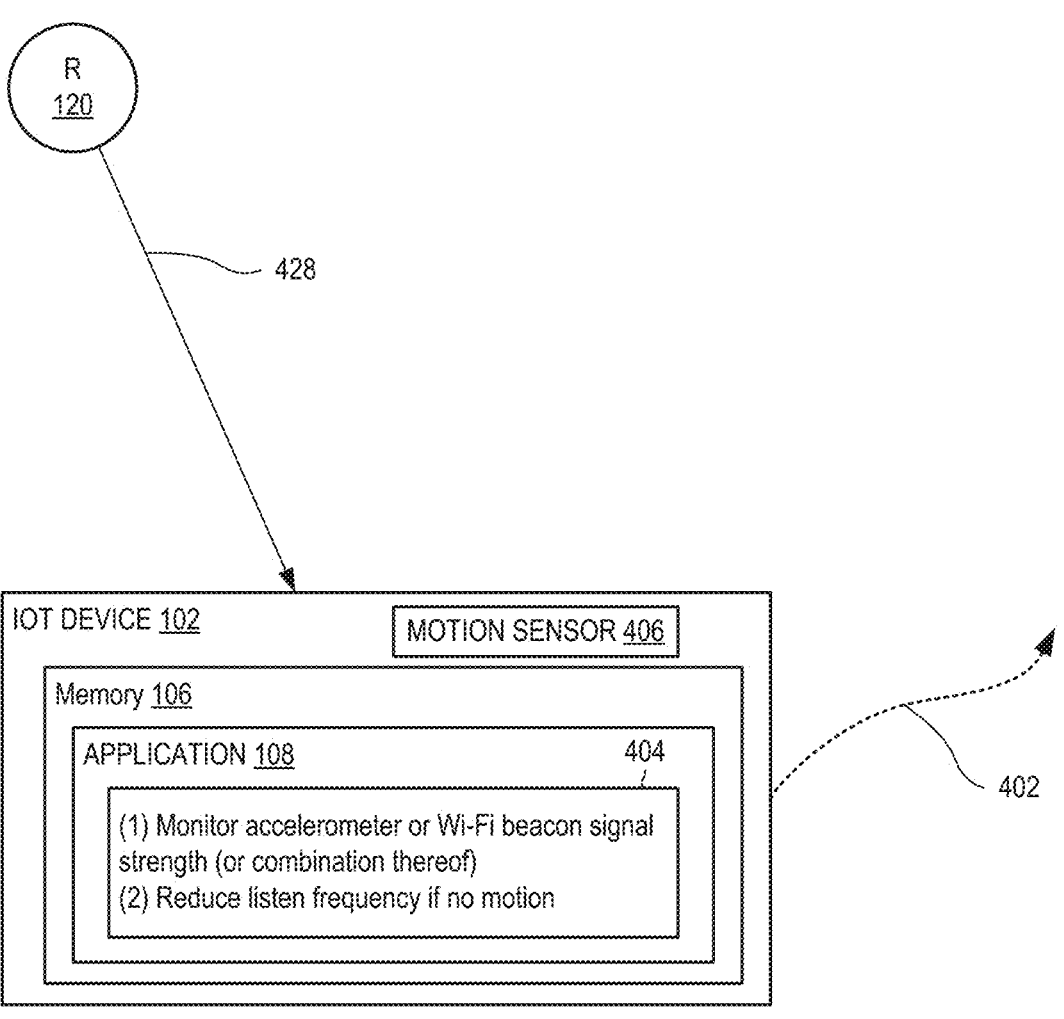
FIG. 4 is a schematic diagram illustrating logic of an IoT device that decides when to scan for a Wi-Fi beacon according to various embodiments.

FIG. 4 shows one example where the IoT device 102 is a tracker that includes a motion sensor 406 (e.g., accelerometer, gyroscope, etc.) that indicates when the IoT device 102 moves (indicated by dashed arrow 402). Accordingly, when the motion sensor 406 indicates that the IoT device 102 is moving, the IoT device 102 may decrease the listening interval to receive a beacon frame 428 (which represents one or both of the standard beacon frame 128 and/or the IoT beacon frame 228) more frequently, and thereby be more responsive (lower latency of response) to the command 150 from the server 140. For example, the IoT device 102 may transition from a non-active state to an active state more frequently to operate a Wi-Fi chipset to receive the standard beacon frame 128 and/or the IoT beacon frame 228 to determine whether there is a command 150 waiting for it at the server 140. Conversely, when the motion sensor 406 does not indicate movement, the IoT device 102 may increase the listening interval to receive the standard beacon frame 128 and/or the IoT beacon frame 228 less frequently, and thereby reduce power consumption at the expense of being less responsive (higher latency of response) to command 150 from the server 140. For example, the IoT device 102 may increase the time it spends in the inactive state, transitioning less frequently to the active state to operate the Wi-Fi chipset receive the standard beacon frame 128 and/or the IoT beacon frame 228. Accordingly, the IoT device 102 saves more power when not moving. Block 404 shows example logic implemented within the application 108 of the IoT device 102. In certain embodiments, when the IoT device 102 does not include the motion sensor 406, the IoT device 102 may evaluate changes in radio frequency (RF) signal strength measurements of the standard beacon frame 128 and/or the IoT beacon frame 228 to determine whether the IoT device 102 is moving.

Operation when IoT Device is not Connected to a Wi-Fi Router

Figure 5A:
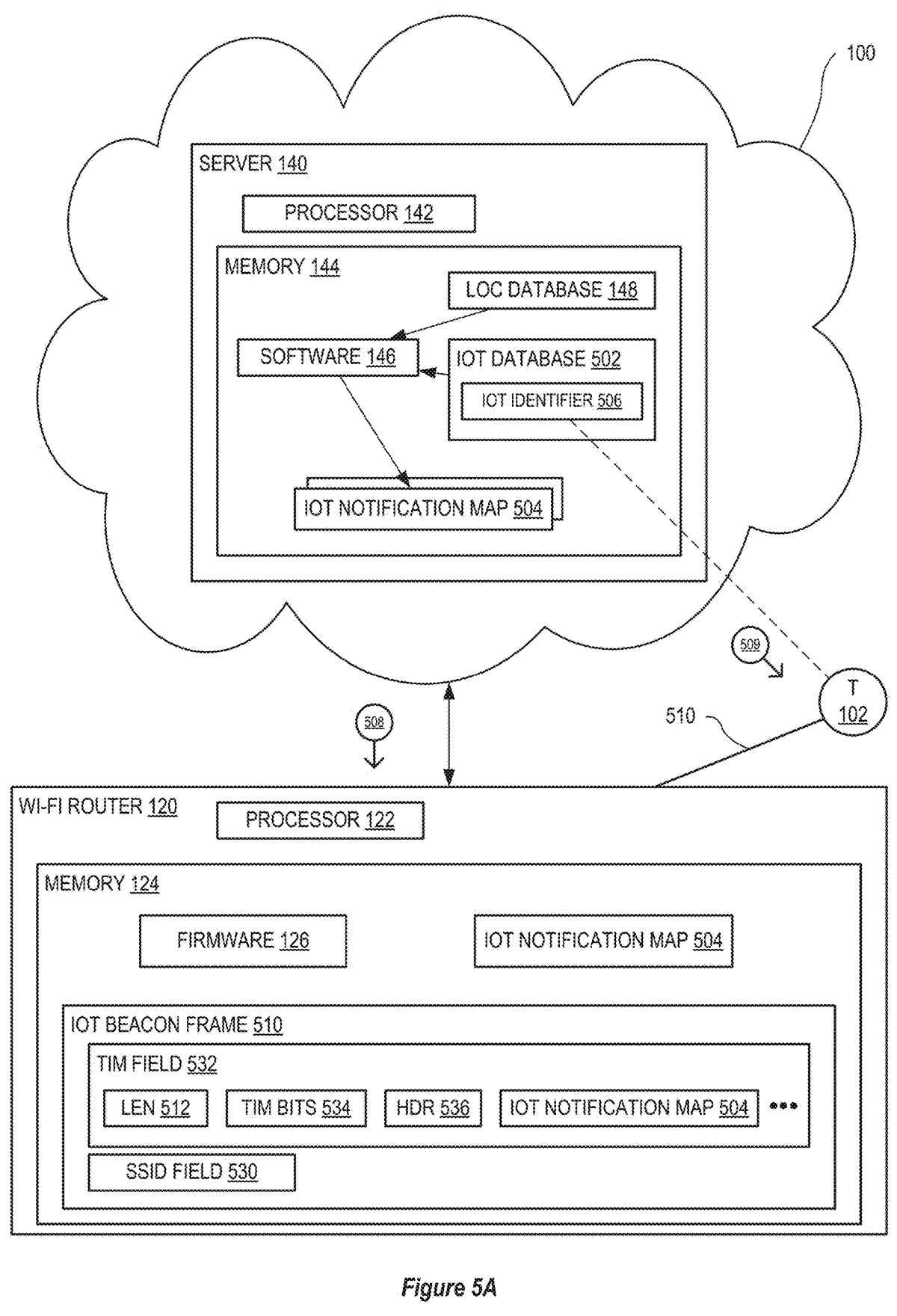
Figure 5B:
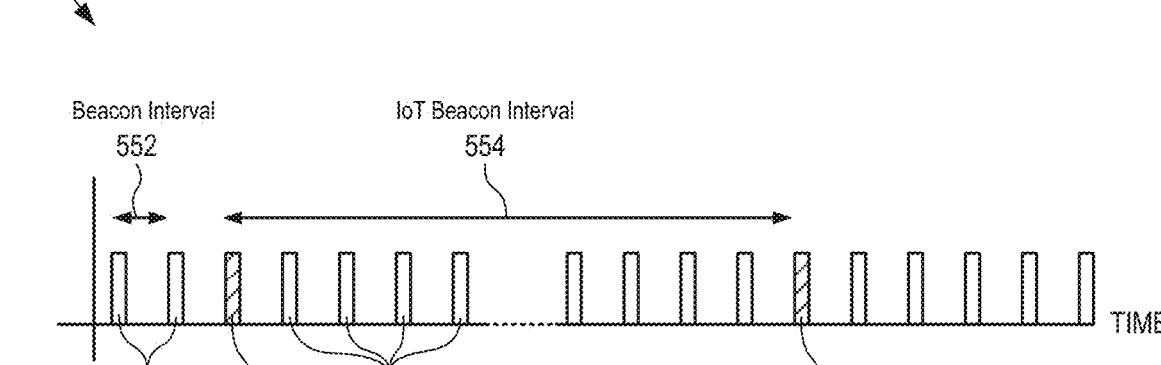
FIG. 5B is a graph illustrating example timing of the standard beacon frame and the IoT beacon frame of FIG. 5A according to various embodiments.

FIG. 5A is a schematic diagram illustrating one example method for indicating a command is available within an IoT beacon frame 510 according to various embodiments. IoT beacon frame 510 discussed below may, alternatively or in addition to, include the information discussed above with respect to the IoT beacon frame 228. FIG. 5B is a graph 550 illustrating example timing of the standard beacon frame 128 and the IoT beacon frame 510 of FIG. 5A. When the IoT device 102 is connected to the Wi-Fi router 120, the Wi-Fi router allocates one bit within the TIM field 132 to that IoT device 102. However, when the IoT device is not connected to the Wi-Fi router 120, there is no bit within the TIM field 132 allocated to the IoT device 102. Certain of the beacon fields generated by the Wi-Fi router 120 may include a delivery traffic indication map (DTIM) in a DTIM field for example, in place of the TIM field 132.

In certain embodiments, the server 140 may determine, using a last received (or last approximated) location of the IoT device 102 stored within an IoT location database 502 and a location of the Wi-Fi router 120 stored within the location database 148, that the IoT device 102 is near to the Wi-Fi router 120, and the server 140 wishes to communicate with the IoT device 102. Accordingly, the software 146 generates an IoT notification map 504 for the Wi-Fi router 120, and sends the IoT notification map 504 to the Wi-Fi router 120, shown as message 508. The software 146 may assign an IoT identifier 506 to uniquely identify the IoT device 102 with respect to the Wi-Fi router 120. The IoT device 102 may automatically connect to a newly found Wi-Fi router 120, for example when it moves out of range of the previous Wi-Fi router 120, to report its current rough or exact location to the server 140. Further, when the IoT device 102 has not received a command (e.g., the command 150) from the server 140 for a certain time interval, the IoT device 102 may connect to the Wi-Fi router 120 and send its current rough or exact location to the server 140. This may ensure that the IoT device 102 does not become lost.

The firmware 126 within the Wi-Fi router 120 generates the TIM field 532 to include the IoT notification map 504. The TIM field 532 thus may include information of a TIM field 132 of the standard beacon frame 128, or may be entirely separate from a standard beacon frame 128. The TIM field 532 is an example of the TIM field 232 discussed above. The TIM field 532 includes a length field 512 that defines a length of the TIM field within the IoT beacon frame 510 and TIM bits 534 that are generated by the Wi-Fi router 120. The length field 512 and the TIM bits 534 are also included within the standard beacon frame 128.

In a first embodiment, the IoT notification map 504 is added to the TIM field 532 with a header 536 (e.g., five bytes having a predefined bit pattern) that may be detected by the IoT device 102. The firmware 126 may add the header 536 after the TIM bits 534 of the standard beacon frame 128, and then adds the IoT notification map 504 after the header 536. The firmware 126 then adjusts the length 512 to represent the additional length of the TIM field 532 (e.g., by summing the length of the TIM bits 534, the header 536, and the IoT notification map 504). In various embodiments, by appending or otherwise including the IoT notification map 504 to the TIM field 510 or other field of the standard beacon frame 128, the firmware 126 (or, in some embodiments, the server 140) generates the IoT beacon frame 510.

In a second embodiment, the firmware 126 omits the TIM bits 534 and the header 536 from the TIM field 532, adding only the IoT notification map 504 and setting the length field 512 according to the length of the IoT notification map 504. Thus, the TIM field 532 does not contain the information as provided in the standard beacon frame 128.

The TIM field 532 is shown in memory 124 for convenience of illustration, however, the TIM field 532 need be not be stored within memory 124 and may be generated contemporaneously or near contemporaneously with transmission within the Wi-Fi router 120 and/or a Wi-Fi chipset thereof. Since the Wi-Fi router 120 is unlikely to have the maximum number of client devices connected to it at any one time, the TIM field 532 usually has sufficient length remaining to accommodate the IoT notification map 504. Accordingly, the IoT notification map 504 may be transmitted in the IoT beacon frame 510 by the Wi-Fi router 120.

Although, in the above example, the IoT notification map 504 is shown included within the TIM field 532, in other embodiments the IoT notification map 504 may be included after the SSID 131 of a standard beacon frame 128 within an SSID field 530 of the IoT beacon frame 510 replacing or in addition to the standard beacon frame 128, wherein a length of the SSID field 530 (similar to SSID field 230 discussed above) is adjusted according to a size of the IoT notification map 504. The SSID field 530 is an example of the SSID field 230.

In one embodiment, the IoT notification map 504 comprises one or more bits for each IoT device 102 within the area (e.g., the communication range) of the Wi-Fi router 120, and the software 146 may assign the IoT identifier 506 as zero for a first IoT device 102 near to the Wi-Fi router 120, one for a second IoT device near to the Wi-Fi router

120, and so on). The software 146 may also notify (shown as message 509) the IoT device 102 of the IoT identifier 506 when assigned within the server 140. Accordingly, the IoT device 102 may receive the IoT beacon frame 510 and evaluate the corresponding bits of the IoT notification map 504, based at least in part upon the assigned IoT identifier 506.

In another embodiment, the IoT notification map 504 does not have one or more bits that are mapped to each of the IoT identifiers 506. Rather, the IoT notification map 504 may include the IoT identifier 506 to notify the corresponding IoT device 102 of a need to communicate with the server 140. Accordingly, the IoT identifiers 506 of the IoT device 102 that are near the Wi-Fi router 120 are not necessarily consecutively numbered from zero, for example the IoT identifier 506 may be determined by other techniques such as by hashing the MAC address of the IoT device 102, generated randomly, and so on. The server 140 may notify the IoT device 102 of the assigned IoT identifier 506 and the IoT device 102 may receive the IoT beacon frame 510 and determine whether the IoT notification map 504 includes the assigned IoT identifier 506 to determine whether it should contact the server 140.

Accordingly, the server 140 may define the IoT notification map 504 for a specific one of the Wi-Fi routers 120 based upon one of the IoT devices 102 near to the Wi-Fi router 120, send the IoT notification map 504 to the corresponding Wi-Fi router 120, and use the IoT notification map 504 to indicate when a specific one of the IoT devices 102 is to connect with the server 140 (e.g., to receive a command from the server 140). Further, when the IoT device 102 moves from being near a first one of the Wi-Fi routers 120 to being near a second one of the Wi-Fi routers 120, the server 140 may update the corresponding IoT notification maps 504 for each of the first and second Wi-Fi routers 120, updating the assigned IoT identifiers 506 as needed.

According to the embodiments described above, the IoT beacon frame 510 of the Wi-Fi router 120 may be modified to indicate to an unconnected IoT device 102 that it should connect and communicate with the server 140. Advantageously, the present embodiments reduce the power used by the IoT device 102, since the IoT device 102 need not repeatedly connect to a Wi-Fi router 120 to determine whether there is a command waiting for it. For example, receiving the IoT beacon frame 510 and determining whether the IoT notification map 504 includes its assigned IoT identifier 506 consumes less power than connecting to the Wi-Fi router 120 and communicating directly with the server 140.

The graph 550 shows timing diagram of the IoT beacon frame 510 replacing (or in addition to) one of the standard beacon frames 128 within a series of standard beacon frames 128. The router 120 represented in graph 550 transmits a standard beacon frame 128 and/or IoT beacon frame 510 periodically according to a beacon interval 552. The IoT beacon frames 510 are transmitted according to the IoT beacon interval 554. There may be the same or a different number of standard beacon frames 128 between each consecutive IoT beacon frames 510.

Figure 6:
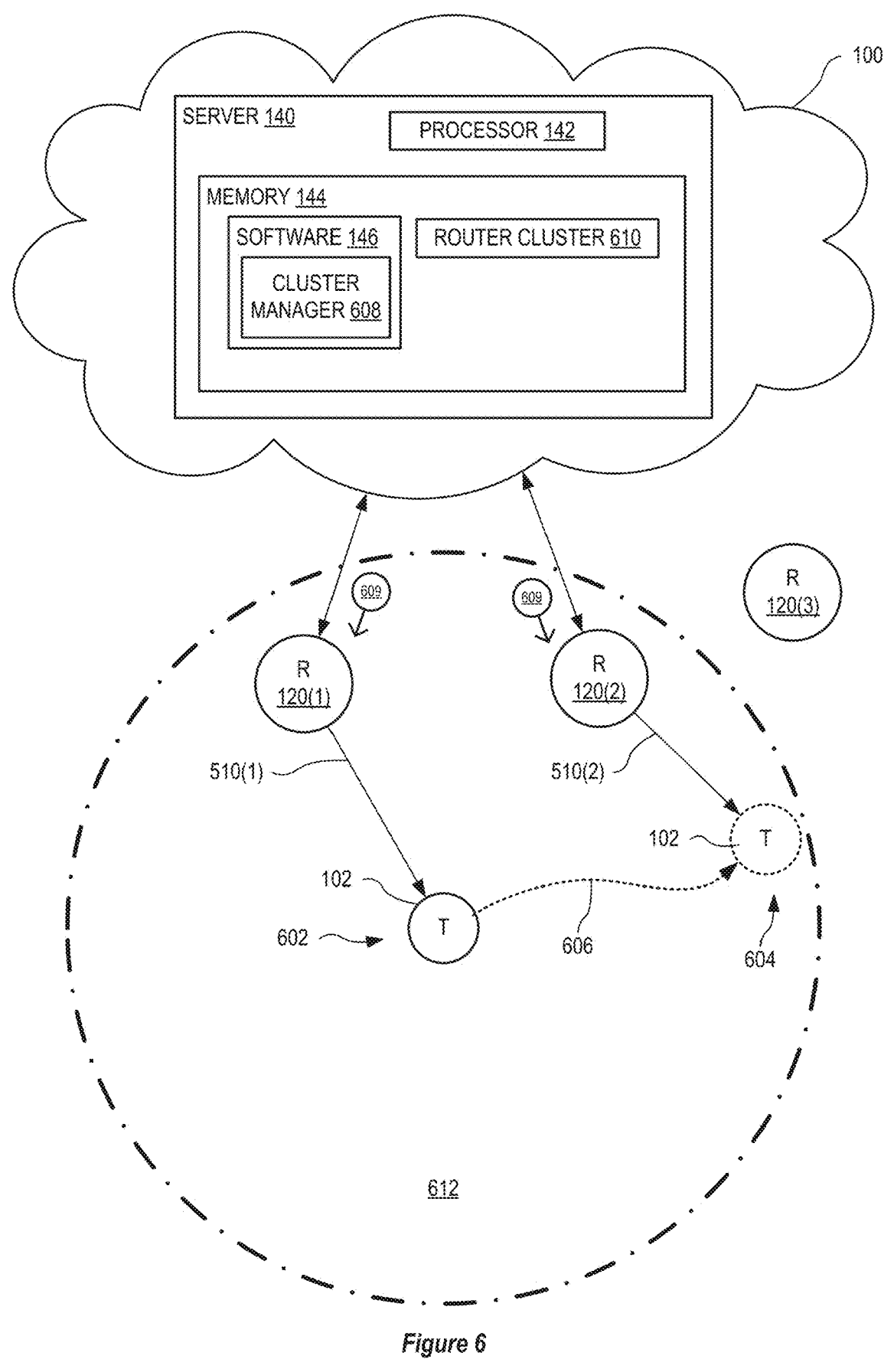

Reducing Power Consumption when a Mobile IoT Device Roams Through Regions with Many Different Wi-Fi Routers When the IoT device 102 is mobile, the power consumed by the IoT device 102 to connect to each encountered Wi-Fi router 120 may form a significant portion of the power available to the IoT device 102. FIG. 6 is a schematic diagram showing the IoT device 102 moving within an area that includes the geographically distributed Wi-Fi routers 120(1)-(3). The IoT device 102 is initially connected (e.g., authenticated and associated) with the first Wi-Fi router 120(1) and moves from a first location 602 to a second location 604, as indicated by arrow 606, where it may be out of range of the first Wi-Fi router 120(1) or in range of both first Wi-Fi router 120(1) and one or more other Wi-Fi routers 120. Conventionally, as it moves, the IoT device 102 may disconnect from the first Wi-Fi router 120(1) and connect to the second Wi-Fi router 120(2), for example as it comes into range of the second Wi-Fi router 120(2) and/or the signal strength of the second Wi-Fi router 120(2) becomes greater than at least one other Wi-Fi router (e.g., the first Wi-Fi router 120(1)). The present embodiments solve this problem using a cluster manager and a router cluster region, as described below.

To reduce power consumed by the IoT device 102, a cluster manager 608 (e.g., part of the software 146, FIG. 1) determines a router cluster region 612 based at least in part upon a radius (or any other shape/boundary/geofence) and a current location of the IoT device 102. For example, the router cluster region 612 may have a radius of one mile, where the center of the radius is a current, rough, or exact location of the IoT device 102. In another example, a shape and/or location of the router cluster region 612 may be based at least in part upon observed movement and/or expected future movement of the IoT device 102. In one example, where the server 140 tracks the location of the IoT device 102 as it moves, the server 140 may define the router cluster region 612 based upon the recorded movements of the IoT device 102. In another example, the server 140 may determine a current velocity of the IoT device 102 (e.g., based upon two or more most recently reported locations) and define the router cluster region 612 based upon a predicted next location (e.g., using extrapolations and/or any other such technique) of the IoT device 102. In certain embodiments, the server 140 may relate the reported locations to a geographical map to predict the next location and shape of the router cluster region 612. The cluster manager 608 may maintain location information of at least some of the Wi-Fi routers 120 in the system, and generate a router cluster 610 identifying one or more Wi-Fi routers of the plurality of Wi-Fi routers 120 that have a geographic location within the router cluster region 612. In the example of FIG. 6, the router cluster region 612 includes the first and second Wi-Fi routers 120(1) and 120(2), and the router cluster 610 identifies (e.g., using a MAC address of the Wi-Fi router 120 and/or the SSIDs 131) the first and second Wi-Fi routers 120(1) and 120(2).

The IoT device 102, when at the first location 602, may connect to the first Wi-Fi router 120(1) and notify the server 140 and/or cluster manager 608 of its current location (e.g., the first location 602). The cluster manager 608 defines the router cluster region 612 corresponding to the first location 602 and generates the router cluster 610 identifying the first and second Wi-Fi routers 120(1) and 120(2). The server 140 notifies other Wi-Fi routers 120 (e.g., the second Wi-Fi router 120(2)) within the router cluster region 612 of the IoT device 102. Accordingly, each IoT device has a corresponding router cluster 610 and router cluster region 612 that may include one or more Wi-Fi routers 120.

When the command 150 (e.g., a location request) for the IoT device 102 is generated by the server 140, the server 140 sends a message 609 to each of the Wi-Fi routers 120(1) and 120(2) identified within the router cluster 610 to indicate the command to the IoT device 102. For example, the message 609 may be similar to the message 508 of FIG. 5, and may contain the IoT notification map 504 for inclusion with the IoT beacon frame 510 by the Wi-Fi router 120. Accordingly, each of the Wi-Fi routers 120(1)-(2) identified within the router cluster 610 includes the same IoT notification map 504 information within the TIM field 532 and/or the SSID field 530 of their respective IoT beacon frames 510 to notify the IoT device 102 of the waiting command. Thus, the IoT device 102 is not required to connect (e.g., authenticate and associate) to the second Wi-Fi router 120(2) when moving to the second location 604, but instead may analyze the TIM field 132 and/or the SSID field 130 (which may be a modified TIM field 232, 532, or modified SSID field 230, 530, if the received beacon frame is a IoT beacon frame 228, 510, and which are broadcast publicly) to determine if it has a message waiting for it, and thus should connect to the Wi-Fi router 120 and communicate with the server 140. Particularly, the IoT device 102 may receive any of the IoT beacon frames 510 transmitted by the Wi-Fi routers 120 of the router cluster 610 to determine it has a command waiting at the server 140 or otherwise included directly within the IoT beacon frame 510.

Regenerating the Router Cluster

When the router cluster 610 is formed, the IoT device 102 may store a location of the router cluster region 612 corresponding to its current location (as used by the server 140 to generate the router cluster region 612) within the memory 106. When the IoT device 102 determines that it has a threshold relationship with respect to the router cluster region 612 (such as when it has moved near or beyond a boundary of the router cluster region 612 (e.g., by comparing its current location, determined as described above, with a boundary of the router cluster region 612), the IoT device 102 may connect to a next-encountered Wi-Fi router (e.g., the third Wi-Fi router 120(3)) and notify the server 140 that it is moving outside the router cluster region 612. In turn, the server 140 may determine a new router cluster region based upon a current location of the IoT device 102 and/or a location of the newly connected third Wi-Fi router 120(3). Additional threshold relationships may also be analyzed, such as when the IoT device 102 is moving in a certain direction with respect to the router cluster region 612 boundary, and/or when the IoT device 102 is moving at a certain speed towards or away from the router cluster region 612 boundary.

The number of bits in the TIM field 532 may be up to two-thousand and eight bits. In certain embodiments, when the IoT notification map 504 has one bit for each of the IoT devices 102 within the router cluster region 612, and there are more than two-thousand and eight of the IoT devices 102 in the router cluster region 612, the server 140 may assign more than one of the IoT devices 102 to the same bit. In these embodiments, the server 140 may set the bit within the IoT notification map 504 (e.g., within the TIM field 532) when a command is available for any one (or more) of the corresponding IoT devices 102 assigned to that bit. Each of the IoT devices 102 assigned to that bit may connect to one of the Wi-Fi routers 120 within the router cluster 610 to request the command from the server 140. However, only those IoT devices 102 specifically addressed by the command may receive the command (and/or data) from the server 140.

In certain embodiments, where the number of the IoT devices 102 within the router cluster region 612 is expected to be large (e.g., greater than two thousand and eight), the IoT notification map 504 (and thus the TIM field 532 and/or SSID field 530) may be generated to include the assigned IoT identifier 506 of the IoT device 102. For example, when there is a command waiting for the IoT device 102, the IoT notification map 504 (and thus the TIM field 532) may include the assigned IoT identifier 506 of the IoT device 102, wherein the IoT device 102 may detect the assigned IoT identifier 506 within the received IoT beacon frame 510 when there is a command available for the IoT device 102.

In certain embodiments, the assigned IoT identifier 506 may uniquely identify each of the IoT devices 102. In other embodiments, the server 140 may assign the IoT identifier 506 to multiple IoT devices 102. The IoT notification map 504, and thus the TIM field 532, may contain multiple assigned IoT identifiers 506, and when the TIM field 532 does not have sufficient space to contain all needed ones of the assigned IoT identifiers 506, the assigned IoT identifiers 506 may appear in subsequently transmitted IoT beacon frames 510.

Connectionless Transmission

Figure 7:
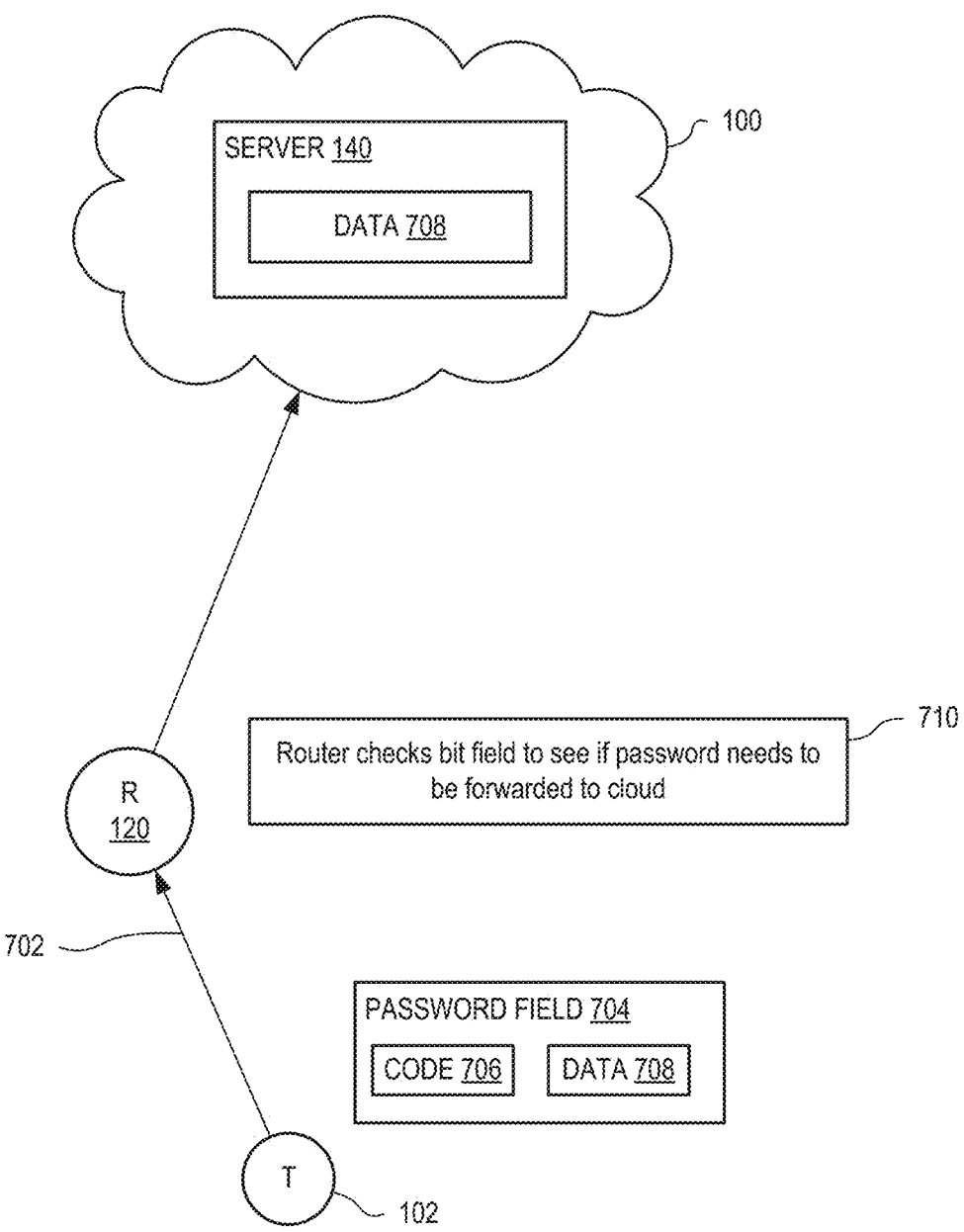
FIG. 7 is a schematic diagram illustrating communication between an IoT device and a network management server through a Wi-Fi router without the IoT device needing to authenticate and associate with the Wi-Fi router according to various embodiments.

When the IoT device 102 has not communicated with the Wi-Fi router 120 for an extended time interval, before being able to send data to the Wi-Fi router 120, the IoT device 102 may need to reconnect (e.g., re-authenticate and/or re-associate) with the Wi-Fi router 120. As noted above, such connecting may consume a relatively large amount of the power (e.g., battery power) available to the IoT device 102. FIG. 7 is a schematic showing one example way for the IoT device 102 to send data to the server 140 via the Wi-Fi router 120 when the IoT device 102 is not connected to (e.g., authenticated and associated with) the Wi-Fi router 120. By enabling the IoT device 102 to send data to the server 140 via the Wi-Fi router 120 when the IoT device 102 is not connected to the Wi-Fi router 120, the present embodiments advantageously achieve power savings versus other methods for communication between IoT devices and servers.

To initiate a connection with the Wi-Fi router 120, the IoT device 102 may send a connection request (e.g., an association request frame) to the Wi-Fi router 120. In response, the Wi-Fi router 120 may send an association response frame that includes a challenge that is to be cyphered by the IoT device 102 and sent to the Wi-Fi router 120 in an authentication frame. Conventionally, the IoT would cypher the challenge, and send the cypher in the password field to the Wi-Fi router 120 for validation. When the password field is validated, the Wi-Fi router 120 may initiate further authentication of the device. Only when the connection is made can the IoT device 102 send data to the Wi-Fi router 120 for onward delivery to another device (e.g., the server 140). Such connection is lengthy and consumes significant power available to the IoT device 102.

As described above, the wireless communication between the IoT device 102 and the Wi-Fi router 120 is relatively power intensive for a limited power device. Accordingly, it is desirable to reduce the wireless handshaking between the IoT device 102 and the Wi-Fi router 120, even when the IoT device 102 is communicating data to the server 140. Advantageously, the present embodiments reduce power consumption within the IoT device 102 when sending data to the server 140. The IoT device 102 sends the authentication request frame to the Wi-Fi router 120, and receives the authentication response frame, as described above. However, rather than cyphering the challenge and returning the cypher, instead the IoT device 102 inserts a code and data into the password field 704, and sends the password field to the Wi-Fi router 120.

To eliminate the need for multiple wireless exchanges, particularly when the size of the data 708 is relatively small, the IoT device 102 may include a code 706 and the data 708 within a password field 704 of a connection request 702. The password field 704 may be sixty-four bytes in length, in one non-limiting example, and the length of the code 706 and the data 708 is less than, or equal to, the length of the password field 704. The code 706 may be predefined and recognizable by the Wi-Fi router 120 as indicating that the password field 704 includes the data 708 that may be sent to the server 140. Accordingly, when the code 706 is recognized, the Wi-Fi router 120 may not validate the password field 704. Rather, upon recognizing the code 706 within the password field 704 of the connection request 702, the Wi-Fi router 120 may decode the data 708 from the password field 704, and send the data 708 to the server 140. In certain embodiments, the data 708 may be encrypted by the IoT device 102, may pass through the Wi-Fi router 120 in encrypted form, and may be decrypted by the server 140.

In certain embodiments, the server 140 may send the Wi-Fi router 120 an acknowledgement of receiving the data 708, wherein the Wi-Fi router 120 may include the acknowledgement as a second code within the SSID field 530 and/or the TIM field 532 within one or more subsequently transmitted IoT beacon frames 510. Accordingly, by recognizing the acknowledgement code within the IoT beacon frame 510, the IoT device 102 may be notified that the data 708 was received by the server 140 (e.g., that it was a successful transmission). Additional information may be encoded in the password field 704, such as an identity of the IoT device 102.

Intelligent Connection Logic for Mobile IoT Devices

When the IoT device 102 is moving, particularly when moving quickly, by the time it discovers the Wi-Fi router 120 and is ready to connect, it might have already moved beyond communication range with the Wi-Fi router 120 (e.g., due to signal strength and range of one or both of the router and the IoT device). Thus, when moving, any attempt to communicate with the router may be a waste of the limited amount of power (e.g., battery) available to the IoT device 102. Accordingly, to avoid wasting power, in the present embodiments the IoT device 102 may include the following logic (e.g., software and/or firmware of the application 108, FIG. 1) to decide whether it is worthwhile to attempt to connect to the Wi-Fi router 120.

The IoT device 102 may, at certain intervals, receive the standard beacon frame 128, the IoT beacon frame 228, and/or the IoT beacon frame 510 from one or more Wi-Fi routers 120 that are within range. When the SSIDs 131 of received beacon frames 128 and/or the SSIDs of the IoT beacon frames 228 or 510 changes frequently, this is an indication that the IoT device 102 is moving quickly and that connecting with one of the Wi-Fi routers 120 may not be possible or desirable. Accordingly, when the IoT device 102 determines that the rate of change of SSIDs is above a certain threshold, the IoT device 102 may decide that connecting to one of the Wi-Fi routers 120 may fail and therefore may suppress connection attempts. The IoT device 102 may also use one or more on-board sensors (e.g., one or more of a motion sensor, an accelerometer, a magnetic field sensor, and so on), when so equipped, to determine when it is moving fast enough that an attempt to connect with any one Wi-Fi router 120 is likely to be unsuccessful. The IoT device 102 may also use received signal strength indications (RSSI) received as signals (e.g., the standard beacon frames 128, the IoT beacon frames 228, and/or the IoT beacon frames 510) from one or more Wi-Fi routers 120 to determine that an attempt to connect with any one Wi-Fi router 120 is likely to be unsuccessful. Accordingly, when moving too fast, the IoT device 102 does not waste power attempting to connect with the Wi-Fi router 120, since the Wi-Fi router

120 will likely be out of range before the communication is successful. The IoT device 102 may, instead, store a history of the standard beacon frames 128 and/or IoT beacon frames 228 or 510 (and information therein) received, and, when next able to do so, transmit a communication to the server 140 (either directly or via communication through the password field of the Wi-Fi router 120 as discussed above) including the stored historical data.

Low Power Receiving of Command while Roaming

When the IoT device 102 receives a command from the server 140 via the Wi-Fi router 120, the IoT device 102 may control when it activates its receiver to receive the IoT beacon frame 228 or 510 transmitted by the Wi-Fi router 120, and thereby determine whether it has a command therein or waiting for the IoT device 102 at the server 140. Accordingly, the IoT device 102 may transition from an active state (e.g., an operational state) to an inactive, low power, state (e.g., where at least its transmitter and receiver are not actively transmitting or receiving) when the IoT beacon frame 228 or 510 is not expected. Thus, the IoT device 102 may be in the inactive state for most of the time, transitioning to the active state for a few milliseconds to receive the IoT beacon frame 510 containing the IoT notification map 504 (e.g., within the SSID field 530 and/or the TIM field 532), and evaluating the IoT notification map 504 to determine whether a command may be retrieved from the server 140. However, when the IoT device 102 is moving, and/or within range of a plurality of different Wi-Fi routers 120 (e.g., when roaming and/or travelling), such power saving may not be possible since the transmission times of the standard beacon frames 128 and/or the IoT beacon frames 228, 510 are not synchronized between different Wi-Fi routers 120, and thus the IoT device 102 cannot predict when a next beacon frame 128 and/or IoT beacon frame 228, 510 may be transmitted, and therefore cannot enter the low power mode to wait for such transmissions. The present embodiments solve this problem by synchronizing transmission times of the standard beacon frames 128 and any additional modification (such as the location of the router 120) and/or the IoT beacon frames 228, 510 from the Wi-Fi routers 120.

Figure 8:
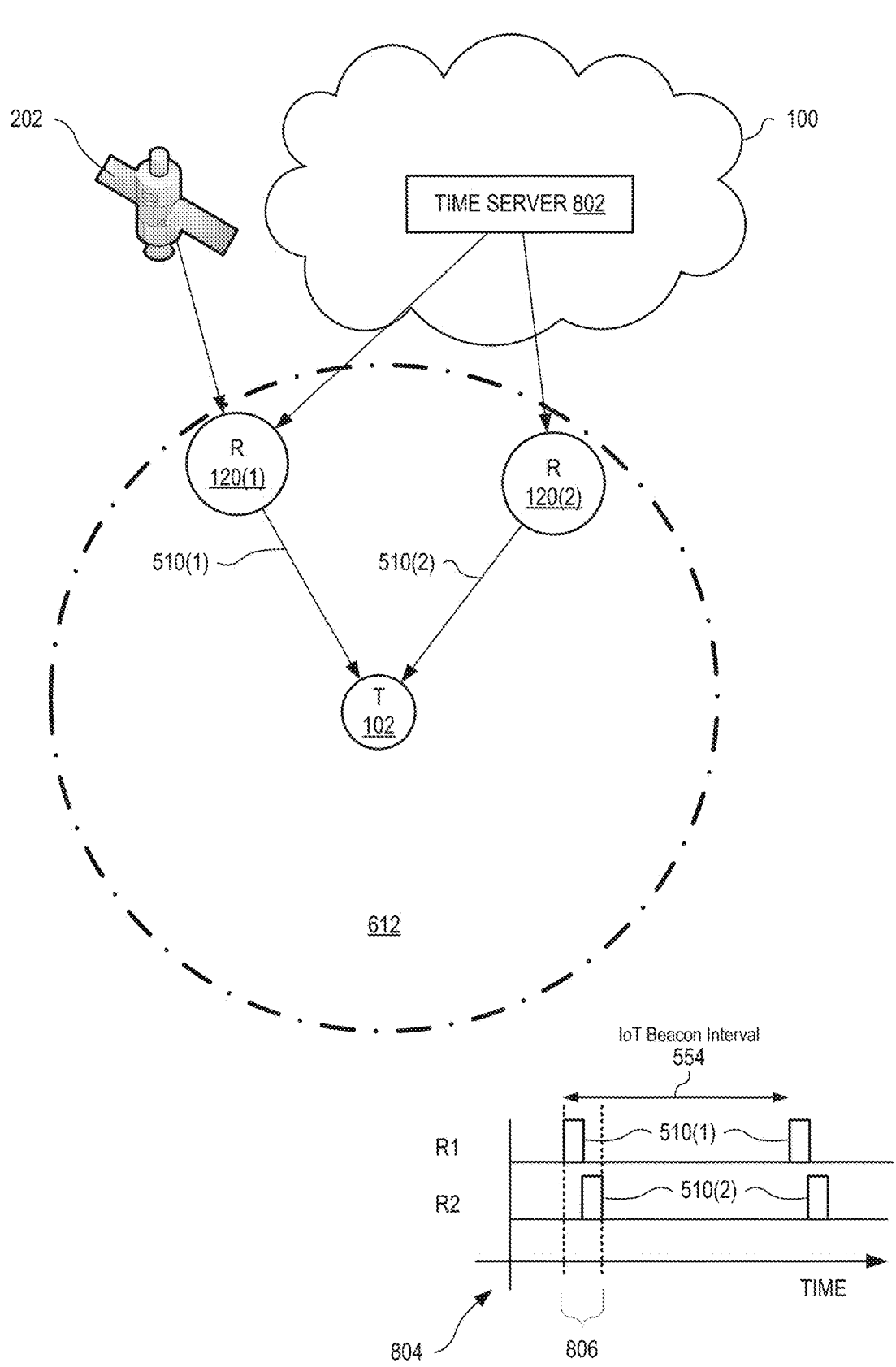
FIG. 8 is a schematic diagram illustrating methods for reducing power consumption of mobile IoT devices by time synchronizing Wi-Fi router beacon frames according to various embodiments.

FIG. 8 shows synchronization of transmission times of the IoT beacon frames 510(1) and 510(2) from the Wi-Fi routers 120(1) and 120(2), respectively. The IoT beacon frames 510 in FIG. 8 may represent the IoT beacon frames 228. In a first approach, each Wi-Fi router 120 uses a time server 802 (e.g., the server 140, FIG. 1) or the GNSS satellite network 202 (FIG. 2) when the Wi-Fi router 120 includes a GPS (or similar) receiver, to synchronize a transmission time of the standard beacon frames 128 including any modification thereto (such as including the location of the router 120) and/or the IoT beacon frames 228, 510 based at least in part by a point in time. Accordingly, at least a portion of the Wi-Fi routers 120 in the router cluster region 612 (FIG. 6) may synchronize transmission of the standard beacon frames 128 and/or the IoT beacon frames 228, 510 such that the IoT devices 102 within that router cluster region 612 may transition between inactive and active states to receive the IoT beacon frame 228, 510 from any of the Wi-Fi routers 120. For example, when the IoT device 102 is moving within the router cluster region 612, since the standard beacon frames 128 and/or the IoT beacon frames 228, 510 are synchronized, it may transition to an active state to receive the IoT beacon frame 228, 510 from one of the Wi-Fi routers 120 within wireless transmission range.

In certain embodiments, where the Wi-Fi routers 120 have overlapping transmission ranges and/or operate within the router cluster region 612, to avoid transmission collision of the standard beacon frames 128 and/or the IoT beacon frames 228, 510 from multiple ones of the Wi-Fi routers 120, the beacon transmit time for each different one of the Wi-Fi routers 120 may be selected from one of a plurality of time slots within a beacon transmission interval 806 as shown in graph 804. Accordingly, the IoT device 102 may transition from a low power state to an active state to receive the IoT beacon frame 228, 510 from any one of the Wi-Fi routers 120. The number of time slots needed, and thus duration of the beacon transmission interval 806, may be determined (e.g., by the server 140) based on a number of the Wi-Fi routers 120 in the router cluster region 612. The greater the density of the Wi-Fi routers 120 in the router cluster region 612, the greater the number of slots needed to avoid beacon transmission collision, and thus the greater the beacon transmission interval 806. Although the IoT device 102 may need to activate its receiver for a greater time interval (the beacon transmission interval 806 may be greater than the duration of any one of the IoT beacon frames 510), and therefore uses more power, the power used is still significantly less than the power needed to receive continually. In certain embodiments, the slots used for transmission of the IoT beacon frame 510 may not be consecutive or near consecutive, wherein the IoT device 102 may transition from an inactive state to an active state to receive the corresponding IoT beacon frame 510 in one or more of the slots.

IoT Device Integrated with Bluetooth and Wi-Fi Radios

FIG. 9 illustrates example logic 908 that may be implemented within the application 108 of the IoT device 102 for connecting the IoT device 102 to a Bluetooth gateway 902 and/or a Wi-Fi gateway 904 (e.g., the Wi-Fi router 120). The IoT device 102 may be configured with both a Bluetooth radio and a Wi-Fi radio. Power consumption of the Bluetooth radio is typically lower than power consumption of the Wi-Fi radio, and therefore it may be preferred to connect via Bluetooth rather than to connect via Wi-Fi. Accordingly, the IoT device 102 may first scan for a Bluetooth beacon 906 from the Bluetooth gateway 902, and when the Bluetooth gateway 902 is unavailable (e.g., the Bluetooth beacon 906 is not detected), the IoT device 102 may then scan for the IoT beacon frame 228, 510 from the Wi-Fi gateway 904 (e.g., the Wi-Fi router 120). By connecting to the Bluetooth gateway 902 in preference to connecting to the Wi-Fi gateway 904, the IoT device 102 may save power, which is advantageous for a battery powered device (or other limited power device). In certain embodiments, the IoT device 102 also may be equipped with a long-range radio, which may use more power than the Wi-Fi radio, and therefore the IoT device 102 may only connect using the long-range radio when both the Bluetooth gateway 902 and the Wi-Fi gateway 904 are unavailable (e.g., not detected).

Figure 10:
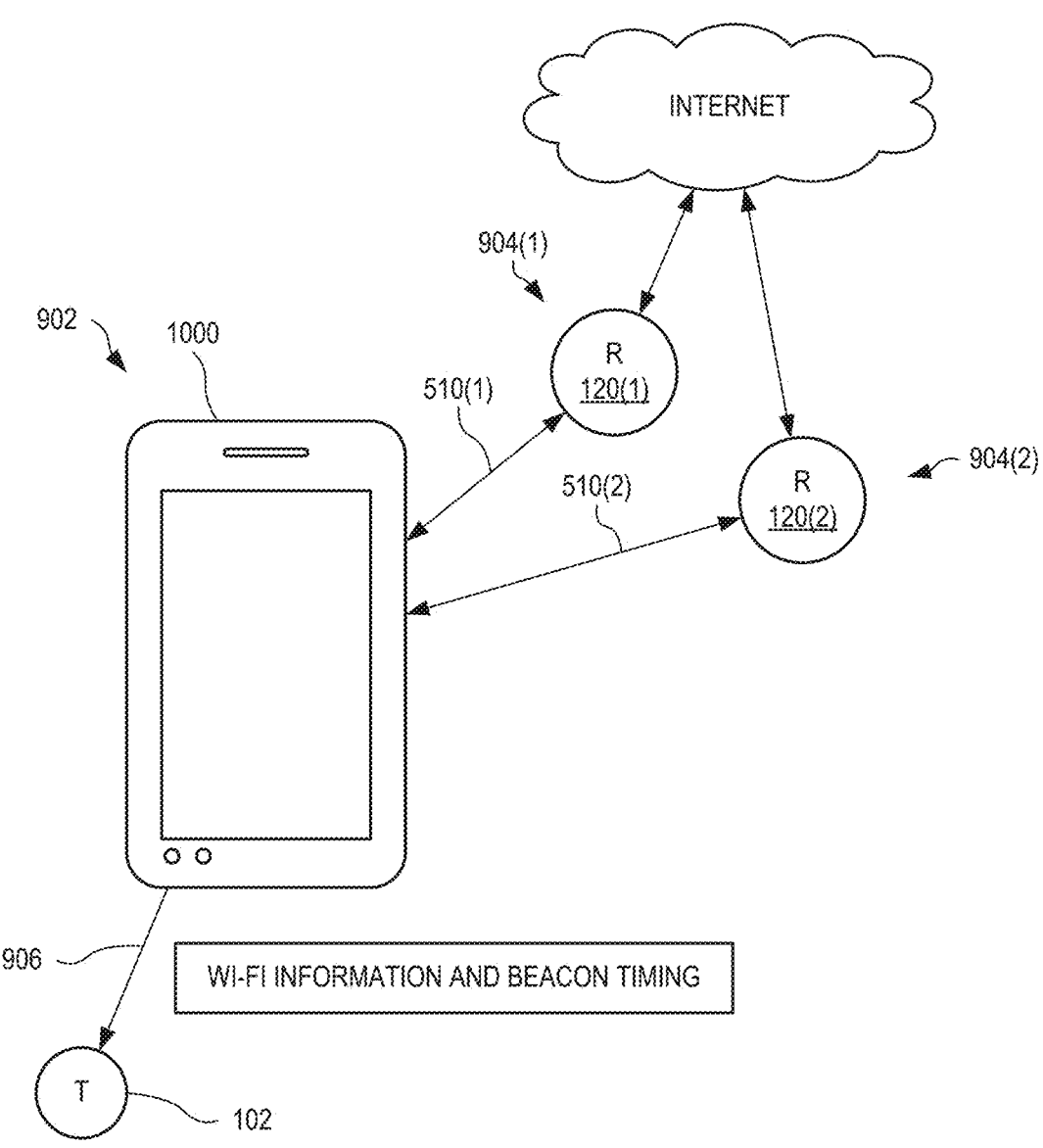
FIG. 10 is a schematic diagram illustrating methods for passing information to IoT devices about local Wi-Fi networks by gateways that have both Wi-Fi and Bluetooth radios according to various embodiments.

When the Bluetooth gateway 902 within range of the IoT device 102 may communication with the Wi-Fi gateway 904 (e.g., the Bluetooth gateway 902 is connected to the first Wi-Fi router 120(1), or the second Wi-Fi router 120(2), with access to the Internet), for example when the Bluetooth gateway 902 is a smartphone 1000 as shown in FIG. 10, further energy savings may be possible. In the example of FIG. 10, the Bluetooth gateway 902 may scan for different Wi-Fi routers 120 in its vicinity. For example, when connected to the Wi-Fi router 120(1), the Bluetooth gateway 902 may detect one or both of the standard beacon frame 128 and/or the IoT beacon frame 510(2) (which may additionally or alternatively represent the IoT beacon frame 228) from the second Wi-Fi router 120(2) and pass corresponding channel information and beacon timing information to the IoT device 102. Accordingly, when the IoT device 102 detects that it is no longer in range of the Bluetooth gateway 902 and has not moved more than a certain distance, the IoT device 102 may first scan for the IoT beacon frames 510(1) and 510(2) of the Wi-Fi routers 120(1) and 120(2) using channel information and beacon timing information received from the Bluetooth gateway 902. Specifically, the IoT device 102 may transition from an inactive, low power, state to an active state at various intervals to receive one or both of beacon frames 510(1) and 510(2).

Encoding Additional Information in the Beacon Frame

As described above, the geographical location of the Wi-Fi router 120 may be encoded within the SSID field 130 and/or the TIM field 132 of the standard beacon frame 128 and/or SSID field 230, 530 and/or TIM field 232, 532 the IoT beacon frame 228, 510, respectively and for the IoT beacon frame 228, 510 the SSID field 230, 530 and/or the TIM field 232, 532 may include at least one bit (e.g., the location of the router 120, and/or the IoT notification map 504) to indicate that a message (e.g., command) is included therein and/or awaits the IoT device 102, or that the IoT device 102 should communicate with the server 140. In certain embodiments, additional information may also be encoded in the SSID field 530 and/or the TIM field 532 of the IoT beacon frame 510. For example, the additional information may include a command or instruction (e.g., not just an indication that a command is waiting, but at least part of the command itself) for the IoT device 102. Accordingly, the IoT device 102 may receive the command from the server 140 without connecting to the Wi-Fi router 120, thereby not expending power to connect and authenticate with the Wi-Fi router 120 to receive the command.

Reducing the Required Number of Channels to Scan

Each of the Wi-Fi routers 120 may broadcast the standard beacon frame 128 and/or the IoT beacon frame 228, 510 on any one of thirteen channels used by the Wi-Fi (IEEE 802.11) protocol. Accordingly, to detect the standard beacon frame 128 and/or IoT beacon frame 228, 510 from the Wi-Fi router 120, the IoT device 102 may need to operate its receiver to receive on up to thirteen channels before detecting the standard beacon frame 128 and/or IoT beacon frame 228, 510. As discussed above with reference to FIG. 9, when available, the Bluetooth gateway 902 may inform the IoT device 102 of the channel information and the beacon timing information of nearby Wi-Fi routers 120, thereby allowing the IoT device 102 to receive on the appropriate channel when transitioning from an inactive state to an active state to receive the IoT beacon frame 228, 510 at the appropriate time, thereby achieving significant power savings. However, when the Bluetooth gateway 902 is not available, the IoT device 102 may search for nearby Wi-Fi routers 120 by controlling its receiver to receive on each channel for a time interval at least equivalent to the beacon interval 552 to receive the standard beacon frame 128 and/or a time interval at least equivalent to the IoT beacon interval 554 to receive the IoT beacon frame 228, 510. Accordingly, use of the receiver during this searching process may consume a significant amount of the power available to the IoT device 102. The present embodiments solve this problem by reducing the number of Wi-Fi channels that the IoT device needs to scan, as described below.

Figure 11:
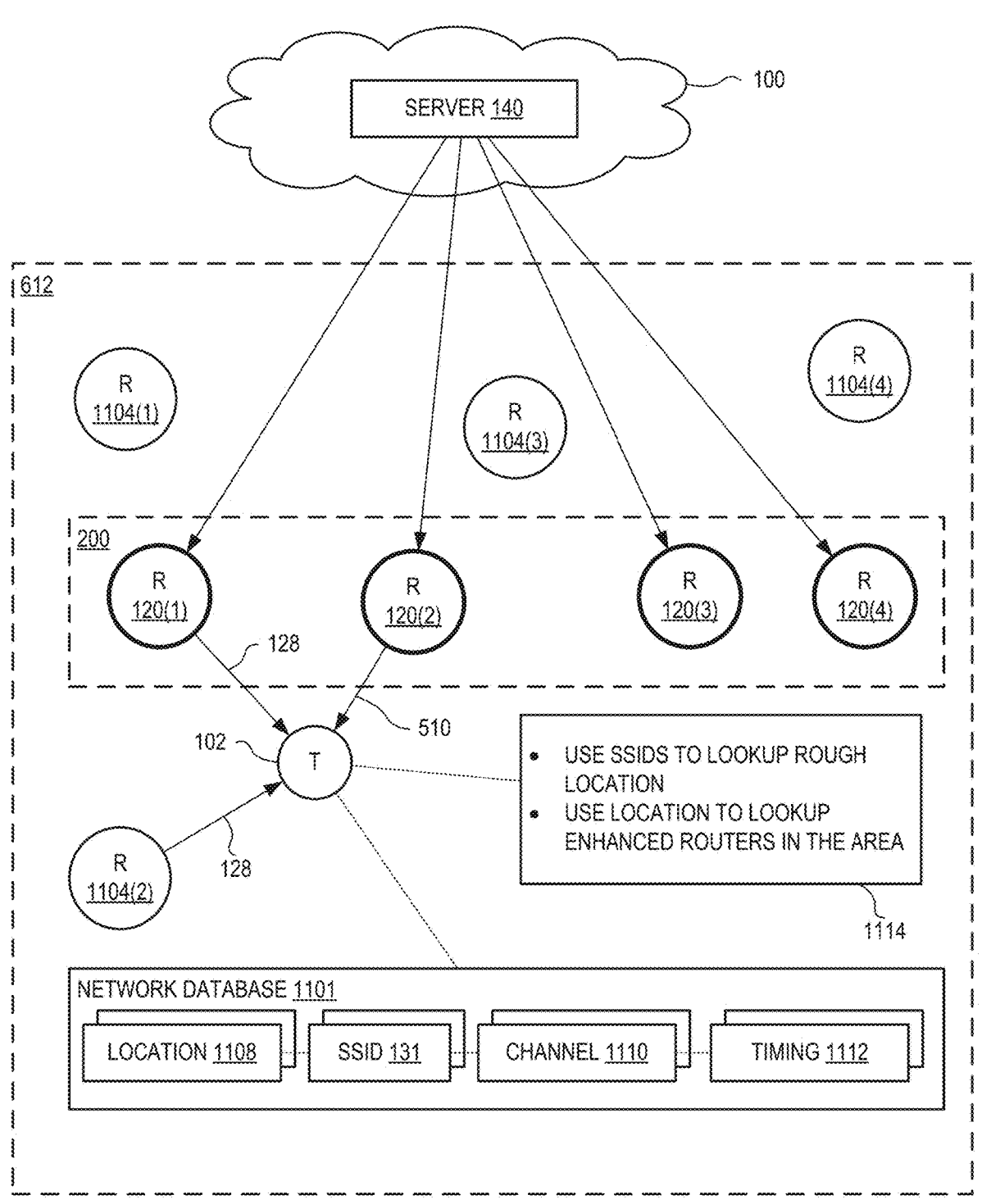
FIG. 11 is a schematic diagram illustrating methods for reducing the number of Wi-Fi channels the IoT device needs to scan according to various embodiments.

FIG. 11 is a schematic diagram illustrating an embodiment for reducing the number of Wi-Fi channels that the IoT device needs to scan. In the example of FIG. 11, the router cluster region 612 corresponding to the IoT device 102 includes four of the Wi-Fi routers 120(1)-(4), each configured with the protocol enhancements disclosed herein, that collectively form at least part of the IoT Wi-Fi environment 200 of FIG. 2. The router cluster region 612 may also contain one or more conventional Wi-Fi routers 1104(1)-(4) that are not configured with the protocol enhancements described herein and that are not part of the IoT Wi-Fi environment 200.

The conventional Wi-Fi routers 1104, even though operating without the IoT device energy saving enhancements disclosed herein, may still be valuable in helping the IoT device 102 to locate itself. As described above, the memory of the IoT device 102 may include a location database (or subset thereof) that allows the IoT device 102 to determine its location based upon one or more received standard beacon frames 128 (and/or IoT beacon frames 228 or 510) and corresponding signal strength. For example, the application 108 may look up its location in the location database portion 314 based at least in part on one or more received beacon frames 128 (and/or IoT beacon frames 228 or 510). The IoT device 102 may also include a network database 1101 that identifies (e.g., using SSIDs 131 within the received standard beacon frame 128 or SSIDs of IoT beacon frames 228 or 510) which of the Wi-Fi routers 120 in the router cluster region 612 are part of the IoT Wi-Fi environment 200 (e.g., that include the enhancements described herein). The IoT device 102 may include logic, implemented within the application 108 and shown in block 1114, for using one or more received SSIDs 131 (or SSIDs within IoT beacon frames 228 or 510) to look up a rough location, and may then compare the rough location to a location 1108 within the network database 1101 to identify one or more of the Wi-Fi routers 120 that are within an area of the IoT device 102 that may provide additional power savings. The network database 1101 may contain channel information 1110 and timing information 1112 for the Wi-Fi router 120 identified by the SSID 131 (or modified SSID within an IoT beacon frame 228 or 510). The network database 1101 allows the IoT device 102 to selectively receive on channels used by the nearby Wi-Fi routers 120, and to receive at the corresponding times to receive the beacon frames 128 and/or the IoT beacon frames 510. For example, the network database 1101 may allow the IoT device 102 to determine whether the Wi-Fi router 120 or conventional Wi-Fi router 1104 corresponding to the SSID 131 (or modified SSID within the IoT beacon frame 228 or 510) includes one or more of the enhancements described herein. In one embodiment, when a received SSID 131 (or modified SSID within the IoT beacon frame 228 or 510) is not found within the network database 1101, the IoT device 102 may assume that the corresponding Wi-Fi router is not participating in the IoT Wi-Fi environment 200.

Client Device Networks

Figure 12:
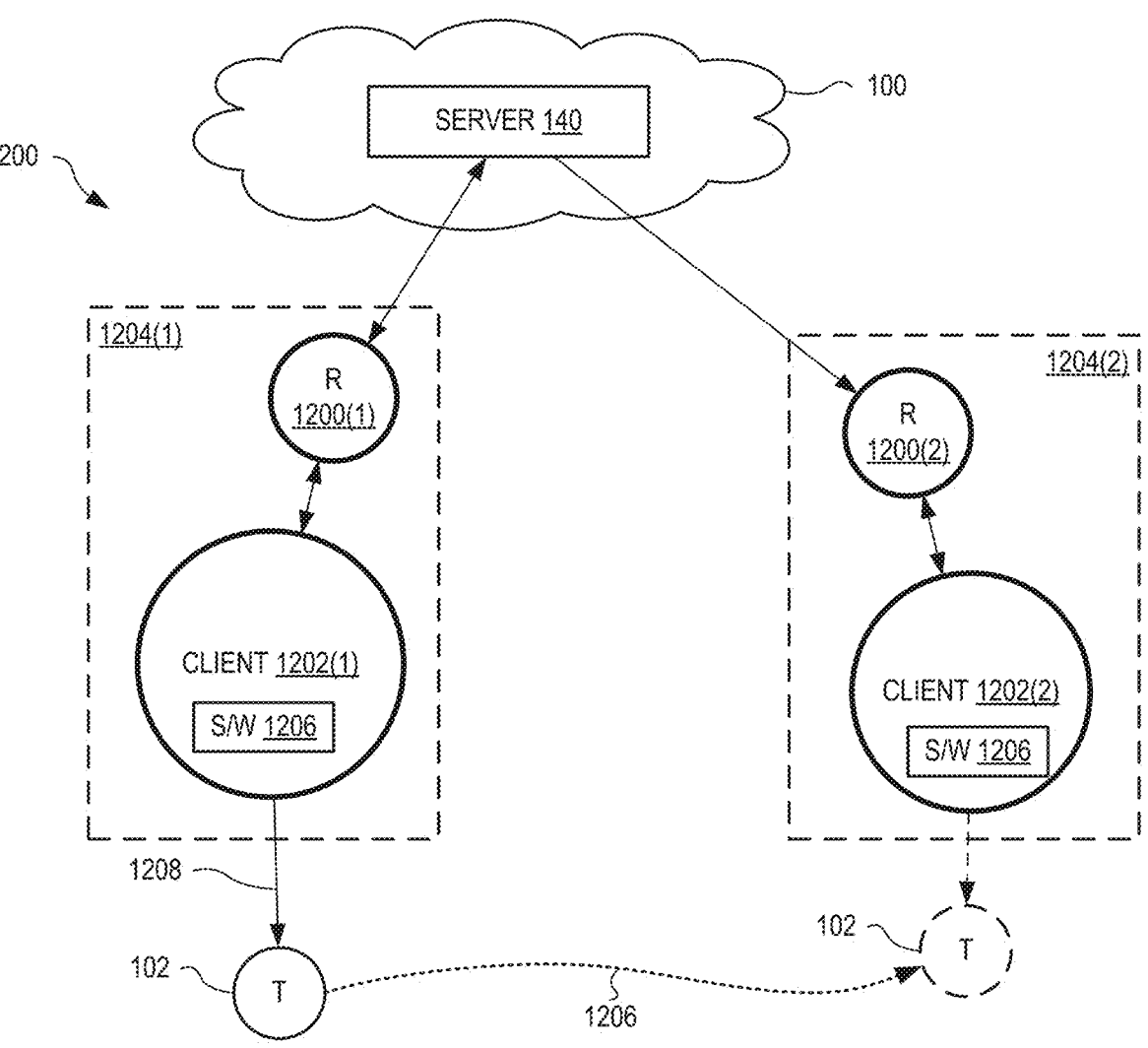
FIG. 12 is a schematic diagram illustrating one example method for low power networking for the IoT device of FIG. 1 according to various embodiments.

FIG. 12 is a schematic diagram illustrating a Wi-Fi client device 1202 forming part of the IoT Wi-Fi environment 200. As shown in FIG. 12, the Wi-Fi client device 1202 may include at least part of the functionality of the Wi-Fi router 120. For example, a software component 1206 may be included in the client device 1202 to operate with certain functionality of the Wi-Fi router 120. The Wi-Fi client device 1202 may represent an audio/video communication device and/or security device, such as a video doorbell.

In the example of FIG. 12, the Wi-Fi client device 1202(1) is configured at a first site 1204(1) (e.g., a residential property, a commercial property, a retail property, and so on) to communicate with a conventional Wi-Fi router 1200(1) at the site 1204(1). The Wi-Fi client device 1202(1) may include a software component 1206 (e.g., a modification to firmware, software, application, etc.) that allows the Wi-Fi client device 1202(1) to operate, at least in part, like the Wi-Fi router 120 of FIGS. 1-11. For example, the Wi-Fi client device 1202(1) may generate, at certain intervals (e.g., the IoT beacon interval 554), an IoT beacon frame 1208 (which is an example of one or both of IoT beacon frame 228 or 510) that may be received by the IoT device 102. As described above, the IoT beacon frame 1208 may include a location of the Wi-Fi client device 1202(1) such that the IoT device 102 may determine its location without connecting. The Wi-Fi client device 1202(1) may continue to function as a client of the conventional Wi-Fi router 1200(1), and thereby allow the IoT device 102 to communicate with the server 140.

A second Wi-Fi client device 1202(2) at a second site 1204(2) may be connected to a second conventional Wi-Fi router 1200(2) at the site 1204(2) and may also include the software component 1206 that allows the second Wi-Fi client device 1202(2) to operate, at least in part, like the Wi-Fi router 120 of FIGS. 1-11. Accordingly, as the IoT device 102 roams from the first site 1204(1) to the second site 1204(2), the IoT device 102 may remain in communication with the IoT Wi-Fi environment 200.

Figure 13:
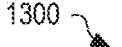
FIG. 13 is a flowchart illustrating one example method for reducing power consumption by IoT devices according to various embodiments.
Figure 13:
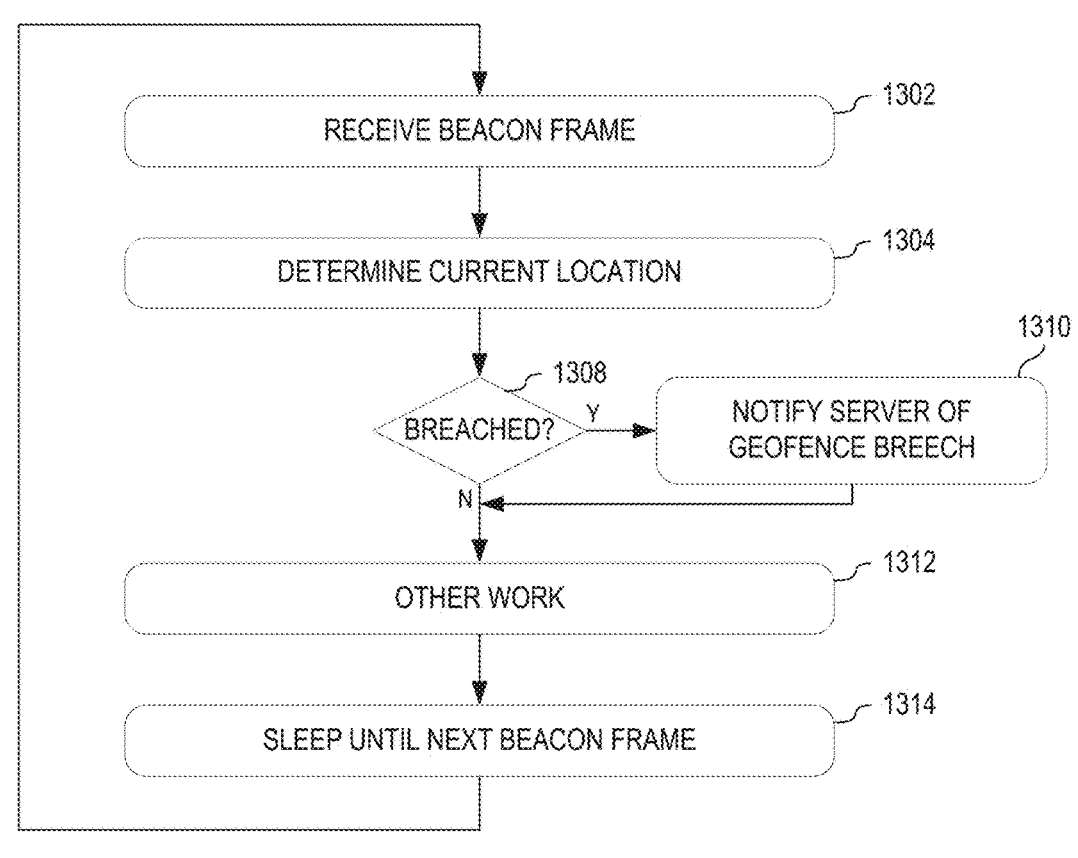

FIG. 13 is a flowchart illustrating one example process 1300, implemented within the IoT device 102 of FIG. 1, for reducing power consumption by the IoT device 102 of FIGS. 1-11 when connected to the IoT Wi-Fi environment 200 of FIGS. 2 and 11. The process 1300 may be implemented within the application 108 of the IoT device 102, for example.

In block 1302, the IoT device 102 receives a beacon frame. In one example of block 1302, the IoT device 102 transitions from an inactive, low power, state to an active state at an appropriate time to receive the standard beacon frame 128 and/or the IoT beacon frame 228, 510 from the Wi-Fi router 120. In another example of block 1302, the IoT device 102 transitions from the inactive state to the active states and stays active until the IoT beacon frame 228, 510 is received; when the IoT beacon frame 228, 510 is not received after a certain interval, the IoT device 102 may return to the inactive, low power, state. In block 1304, the IoT device 102 determines a current location based at least in part on information in the SSID field 130, or encoded in the SSID field 230 or 530 and/or TIM field 232 or 532. In one example of block 1304, the IoT device 102 decodes a location of the Wi-Fi router 120 from the SSID field 130 of the standard beacon frame 128, the SSID field 230 of the IoT beacon frame 228, and/or the SSID field 530 of the IoT beacon frame 510 and determines its location based at least in part upon a received signal strength of the beacon frame. In another example of block 1304, the IoT device receives at least three SSIDs 131 (or modified SSID within the IoT beacon frame 228 or 510) from three different Wi-Fi routers 120 and determines its location using triangulation and/or trilateration based at least in part upon signal strengths of the corresponding beacon frames and their locations.

Block 1308 is a decision. If, in block 1308, the IoT device 102 determines that the geofence is breached, the IoT device 102 continues with block 1310; otherwise, the IoT device 102 continues with block 1312. In one example of block 1308, the IoT device 102 determines whether its current location (determined in block 1304) is outside of the router cluster region 612 (FIG. 6). In another example of block 1308, the IoT device 102 determines its speed and/or direction has a threshold relationship with respect to the router cluster region 612. In block 1310, the IoT device 102 notifies the server of the geofence breach. In one example of block 1310, the IoT device 102 connects with the Wi-Fi router 120 and sends a message indicative of the geofence breach to the server 140. In another example of block 1310, the IoT device 102 encodes the breach of the geofence as the data 708 within the password field 704 of the connection request 702, wherein the Wi-Fi router 120 decodes the data 708 and thereby sends the breach of the geofence to the server 140. In another example of block 1310, the IoT device 102 sends a command to the server 140 via the Bluetooth gateway 902, FIG. 9, when so connected. The IoT device 102 continues with block 1312.

In block 1312, the IoT device 102 performs any other work. In one example of block 1312, the IoT device 102 may captured values from one or more sensors within the IoT device 102. In block 1314, the IoT device 102 transitions to an inactive state until a next beacon frame. In one example of block 1314, the IoT device 102 configures a timer to transition the IoT device 102 to the active state to receive a next beacon message and the, the IoT device 102 transitions to the inactive state (e.g., enters a low power state). When the IoT device 102 is transitioned to the active state by the timer, the IoT device 102 continues with block 1302.

Figure 14:
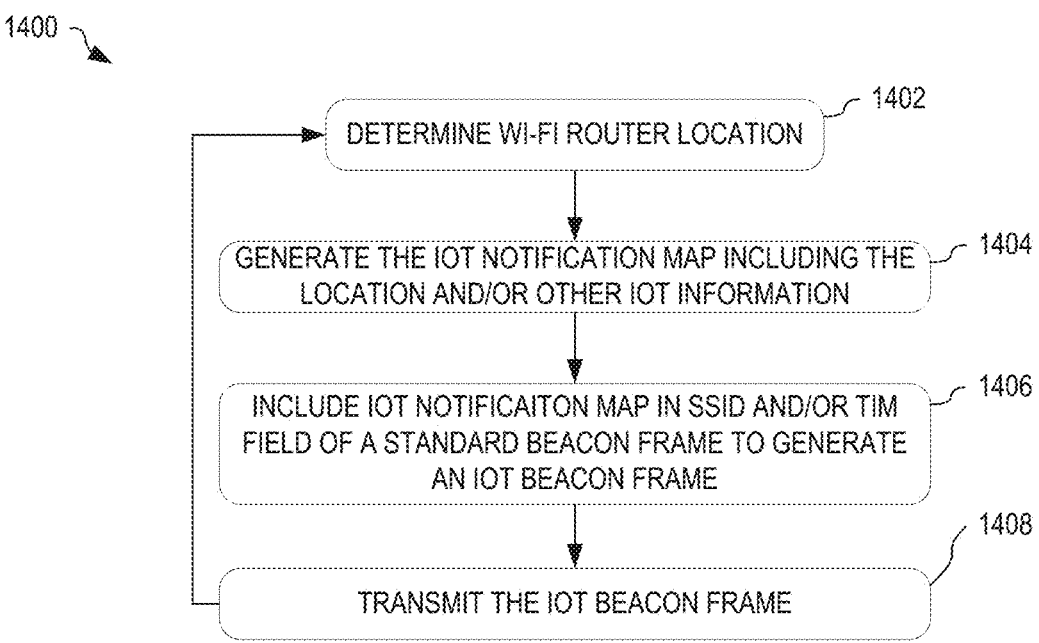
FIG. 14 is a flowchart illustrating one example method for communicating with IoT devices according to various embodiments.

FIG. 14 is a flowchart illustrating one example process 1400 for low power communication with the IoT device 102 of FIGS. 1-11. The process 1400 may be implemented within one or more of the firmware 126 of the Wi-Fi router 120, the software 146 of the server 140, and/or the software component 1206 of the Wi-Fi client device 1202 of FIG. 12, for example.

In block 1402, a location of the Wi-Fi router is determined. In one example of block 1402, the router application 205 within the firmware 126 of the Wi-Fi router 120 determines the geographic location 207 of the Wi-Fi router 120 using the GNSS satellite network 202. In another example of block 1402, a client device (e.g., smartphone 1000, FIG. 10) determines its location when connected to the Wi-Fi router 120 and defines the location within the router accordingly. In another example of block 1402, when the client device 1202 is installed, the delivery location is defined within the client device 1202, during configuration for example. In another example of block 1402, the server 140 identifies the location of the router 120 based on address lookup of the installed router 120.

In block 1404, the method 1400 adds the location to a field of the beacon frame. In one example of block 1404, the router application 205 adds the geographic location 207 to the SSID field 130 of the standard beacon frame 128 to generate the SSID field 230 and/or 530 discussed above. In another example, the server 140 encodes the location within the IoT notification map 504 such that the location appears within the TIM field 532 of the IoT beacon frame 510 or the SSID field 232, or 532, of the IoT beacon frame 228 or 510, respectively upon transmission of the IoT beacon frame 228 or 510 by the router 120.

In block 1406, the IoT notification map generated in block 1404 is included in an SSID and/or TIM field of a standard beacon frame to generate an IoT beacon frame. In one example of block 1406, the server 140 includes the IoT notification map 504 in the SSID field 230 or 530, or the TIM field 232 or 532 to generate the IoT beacon frame 228 or 510. In one example of block 1406, the router 120 receives the IoT notification map 504 transmitted from the server 140 and the router 120 includes the IoT notification map 504 in the SSID field 230 or 530, or the TIM field 232 or 532 to generate the IoT beacon frame 228 or 510.

In block 1408, the IoT beacon frame generated in block 1406 is transmitted. In one example of block 1408, the server 140 transmits the generated IoT beacon frame 228, 510 to the router 120, thereby causing the router 120 to relay the IoT beacon frame 228, 510, as a broadcast receivable by the IoT device 102. In another example of block 1408, the router 120 transmits the IoT beacon frame 228, 510 as a broadcast receivable by the IoT device 102.

Figure 15:
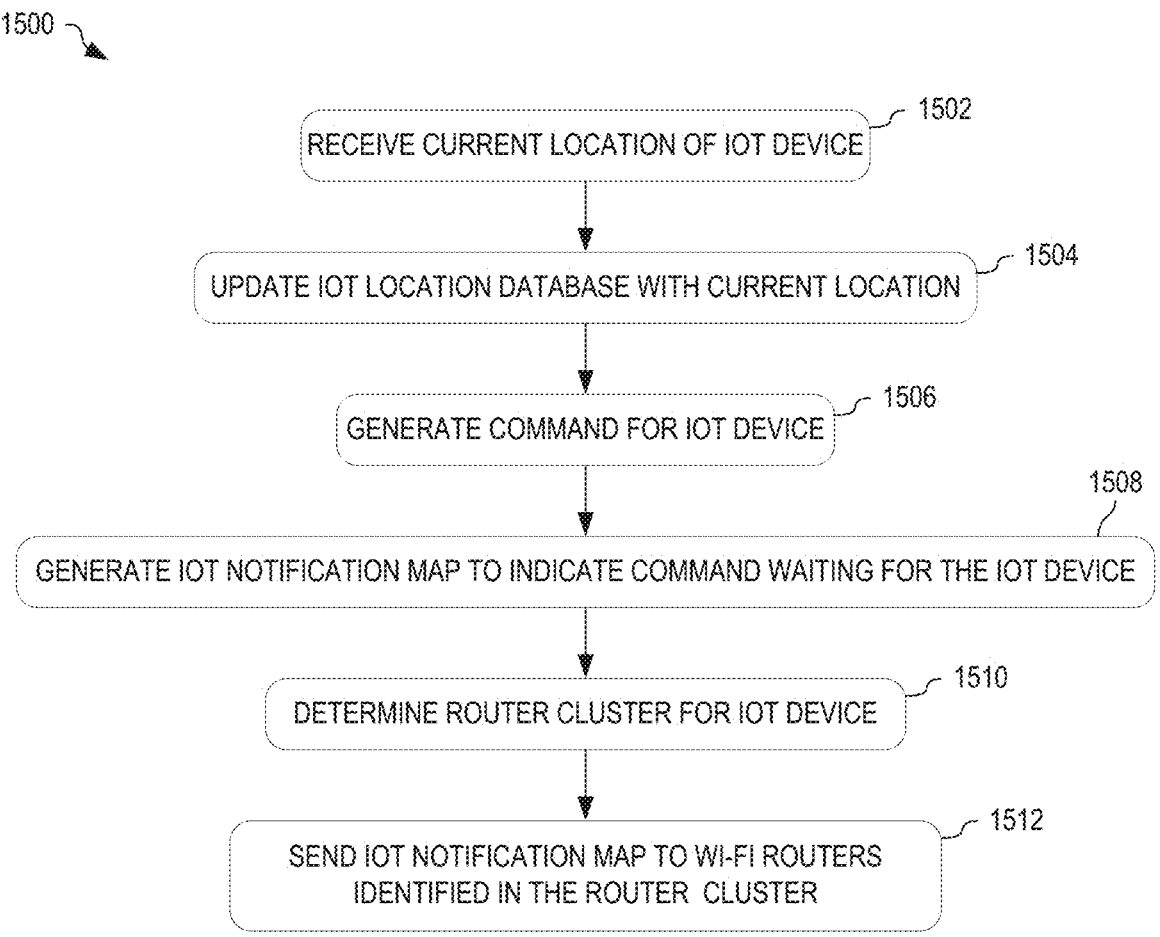
FIG. 15 is a flowchart illustrating one example method for managing IoT Wi-Fi networks according to various embodiments.

FIG. 15 is a flowchart illustrating one example process 1500, implemented within the server 140 of FIG. 1, for managing the IoT Wi-Fi environment 200 of FIGS. 2 and 11. The process 1500 may be implemented within the software 146 of the server 140, for example.

In block 1502, the server 140 receives a current location of an IoT device. In one example of block 1502, the server 140 receives a first location 602 from the IoT device 102. In block 1504, the server 140 updates the IoT location database with the current location. In one example of block 1504, the software 146 updates an entry corresponding the IoT device 102 within the IoT location database 502 with the current location. In block 1506, the server 140 generates a command for the IoT device. In one example of block 1506, the software 146 generates the command 150 to instruct the IoT device 102 to send its current location to the server 140. In another example of block 1506, the command 150 is generated in response to a user of a client device (e.g., the smartphone 1000 of FIG. 10) requesting a location of the IoT device that is operating as a tracker.

In block 1508, the server 140 generates an IoT notification map to indicate the command waiting for the IoT device. In one example of block 1508, the software 146 generates the IoT notification map 504 to indicate to the IoT device 102 that the command 150 is waiting at the server 140. In block 1510, the server 140 determines a router cluster for the IoT device. In one example of block 1510, the software 146 generates the router cluster 610 to include the Wi-Fi routers 120(1) and 120(2) based upon a last determined geographic location (e.g., current location) of the IoT device 102, a radius of the cluster (e/.g., one mile) and geographic locations of the Wi-Fi routers 120(1) and 120(2). In block 1512, the server 140 sends the IoT notification map to the Wi-Fi routers identified in the router cluster. In one example of block 1512, the software 146 sends the IoT notification map 504 to the Wi-Fi routers 120(1) and 120(2), such that the IoT device 102 may receive the IoT beacon frame 510 from any of the Wi-Fi routers 120 of the router cluster 610. Blocks 1502 through 1512 may repeat as the current location of the IoT device 102 changes and/or as the software 146 generates commands for the IoT device 102.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wireless router comprising:
one or more processors; and
one or more computer-readable media storing instructions that, when executed by the one or more processors, cause the one or more processors to perform further operations comprising:
receiving, from a remote system, identifier data representing a unique identifier identifying a first Wi-Fi enabled device, the first Wi-Fi enabled device being unconnected to the wireless router;
determining a location associated with the wireless router;
based at least in part on receiving the identifier data, generating a first beacon frame by at least adding the location to a first field of the first beacon frame and the unique identifier to a second field of the first beacon frame, the first beacon frame being associated with a Wi-Fi protocol; and
transmitting the first beacon frame.

2. The wireless router of claim 1, wherein the one or more computer-readable media store instructions that, when executed by the one or more processors, cause the one or more processors to perform operations comprising:
generating notification map data comprising a first set of one or more bits, each bit of the first set of bits corresponding to a Wi-Fi enabled device of a first set of one or more Wi-Fi enabled devices unconnected to the wireless router, and each bit of the first set of bits indicating whether a message is available for the corresponding Wi-Fi enabled device;
generating a second beacon frame associated with the Wi-Fi protocol, the second beacon frame comprising the notification map data; and
transmitting the second beacon frame.

3. The wireless router of claim 1, wherein the Wi-Fi protocol includes IEEE 802.11.

4. The wireless router of claim 1, wherein the determining of the location associated with the wireless router comprises determining the location using a global navigation satellite system (GNSS) receiver.

5. The wireless router of claim 1, wherein the determining of the location associated with the wireless router comprises determining the location using Internet Protocol (IP) based positioning.

6. The wireless router of claim 1, wherein the first field comprises a service set identifier (SSID) field.

7. The wireless router of claim 1, wherein the first field comprises a traffic indication map (TIM) field.

8. The wireless router of claim 1, wherein the location is encoded in a latitude/longitude format.

9. The wireless router of claim 1, the one or more computer-readable media storing further instructions that, when executed by the one or more processors, cause the one or more processors to perform further operations comprising:
generating a second beacon frame associated with the Wi-Fi protocol, wherein the second beacon frame does not include the location; and
transmitting the second beacon frame.

10. The wireless router of claim 1, wherein the wireless router is one of a plurality of wireless routers within a router cluster, and wherein each wireless router of the plurality of wireless routers transmits a respective beacon frame including an IoT notification map, the IoT notification map including an IoT identifier associated with the first Wi-Fi enabled device.

11. The wireless router of claim 1, the one or more computer-readable media storing further instructions that, when executed by the one or more processors, cause the one or more processors to perform further operations comprising:
based at least in part on the transmitting of the first beacon frame, receiving data from the first Wi-Fi enabled device initiating a connection between the first Wi-Fi enabled device and the wireless router; and
establishing a wireless connection with the first Wi-Fi enabled device.

12. The wireless router of claim 1, wherein the first beacon frame further includes an indication that a command is waiting at the remote system for the first Wi-Fi enabled device.

13. The wireless router of claim 1, wherein the generating of the first beacon frame that is associated with the Wi-Fi protocol comprises:

generating a standard beacon frame that is associated with the Wi-Fi protocol; and generating the first beacon frame by updating the first field of the standard beacon frame to include the location.

14. The wireless router of claim 1, wherein the generating of the first beacon frame further comprises generating the first beacon frame by adding a command to communicate with the remote system.

15. The wireless router of claim 1, the one or more computer-readable media storing further instructions that, when executed by the one or more processors, cause the one or more processors to perform further operations comprising:

based at least in part on the transmitting of the first beacon frame, establishing a wireless connection with the first Wi-Fi enabled device;

receiving command data from the remote system; and sending, using the wireless connection, the command data to the first Wi-Fi enabled device.

16. The wireless router of claim 1, wherein the unique identifier uniquely identifies the first Wi-Fi enabled device with respect to the wireless router.

17. The wireless router of claim 1, wherein the unique identifier was generated based on a MAC address of the first Wi-Fi enabled device.

* * * * *